(12) United States Patent
Nagumo

(10) Patent No.: US 9,235,349 B2
(45) Date of Patent: Jan. 12, 2016

(54) DATA DUPLICATION SYSTEM, DATA DUPLICATION METHOD, AND PROGRAM THEREOF

(71) Applicant: Kazuyuki Nagumo, Tokyo (JP)

(72) Inventor: Kazuyuki Nagumo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 305 days.

(21) Appl. No.: 13/845,271

(22) Filed: Mar. 18, 2013

(65) Prior Publication Data

US 2013/0262804 A1 Oct. 3, 2013

(30) Foreign Application Priority Data

Mar. 30, 2012 (JP) .................................. 2012-078758

(51) Int. Cl.
*G06F 12/00* (2006.01)
*G06F 13/00* (2006.01)
*G06F 13/28* (2006.01)
*G06F 3/06* (2006.01)
*G06F 11/14* (2006.01)

(52) U.S. Cl.
CPC .............. *G06F 3/0641* (2013.01); *G06F 3/061* (2013.01); *G06F 3/0689* (2013.01); *G06F 11/1456* (2013.01); *G06F 11/1466* (2013.01); *G06F 3/0608* (2013.01); *G06F 2201/84* (2013.01)

(58) Field of Classification Search
CPC .................................................... G06F 3/0641
See application file for complete search history.

(56) References Cited

U.S. PATENT DOCUMENTS

| 7,516,286 | B1 * | 4/2009 | Dalal .................... G06F 3/0608 707/999.202 |
| 7,587,562 | B2 * | 9/2009 | Nagumo et al. .............. 711/162 |
| 7,908,436 | B1 * | 3/2011 | Srinivasan ............ G06F 3/0622 711/103 |
| 8,099,571 | B1 * | 1/2012 | Driscoll .............. G06F 11/2066 707/655 |
| 8,156,306 | B1 * | 4/2012 | Raizen .................. G06F 3/0608 707/813 |
| 8,190,836 | B1 * | 5/2012 | Zheng .................. G06F 3/0608 711/162 |

(Continued)

FOREIGN PATENT DOCUMENTS

| JP | 2002373093 A | 12/2002 |
| JP | 2005208950 A | 8/2005 |

(Continued)

OTHER PUBLICATIONS

Japanese Office Action for JP Application No. 2012-078758 mailed on Mar. 4, 2014 with partial English Translation.

*Primary Examiner* — Yong Choe
*Assistant Examiner* — Daniel C Chappell

(57) ABSTRACT

To directly and smoothly execute data update on a duplication volume while suppressing a load on a master volume, when performing backup by employing the snapshot system. The duplication system includes: duplication volumes for a master volume; a shared volume for storing duplication data of the duplication volumes; and a main control unit which manages data accesses made from a host computer to the duplication volumes and manages data storing places. The main control unit includes a data duplication control module having a function which duplicates data of the master volume to the duplication volumes when updating the master volume, and directly performs data update to each of the duplication volumes when updating the duplication volumes.

7 Claims, 15 Drawing Sheets

(56) References Cited

U.S. PATENT DOCUMENTS

| | | | | |
|---|---|---|---|---|
| 8,341,367 B2* | 12/2012 | Akirav | G06F 11/1448 | 707/610 |
| 8,356,017 B2* | 1/2013 | Akirav | G06F 17/30581 | 707/692 |
| 8,370,593 B2* | 2/2013 | Arakawa | G06F 3/0608 | 711/161 |
| 8,381,217 B1* | 2/2013 | Wijayaratne | H04L 67/1097 | 709/223 |
| 8,402,237 B2* | 3/2013 | Usgaonkar | G06F 3/0608 | 711/155 |
| 8,447,726 B2* | 5/2013 | Patterson | G06F 3/0611 | 707/626 |
| 8,452,932 B2* | 5/2013 | Pangal | G06F 11/1453 | 711/162 |
| 8,458,418 B1* | 6/2013 | Singh | G06F 3/0641 | 711/161 |
| 8,527,544 B1* | 9/2013 | Colgrove | G06F 3/0608 | 707/791 |
| 8,543,551 B2* | 9/2013 | Tofano | G06F 17/30159 | 707/687 |
| 8,543,609 B1* | 9/2013 | Natanzon | G06F 3/0605 | 707/791 |
| 8,566,541 B2* | 10/2013 | Choi | G06F 3/0608 | 711/162 |
| 8,589,640 B2* | 11/2013 | Colgrove | G06F 17/30159 | 707/692 |
| 8,612,702 B1* | 12/2013 | Krishnan | G06F 3/0608 | 707/646 |
| 8,627,000 B2* | 1/2014 | Green | G06F 3/0607 | 710/58 |
| 8,639,669 B1* | 1/2014 | Douglis | G06F 17/30159 | 707/692 |
| 8,700,871 B2* | 4/2014 | Saika | G06F 3/0604 | 707/610 |
| 8,712,962 B1* | 4/2014 | Natanzon | G06F 11/1471 | 707/634 |
| 8,732,403 B1* | 5/2014 | Nayak | G06F 3/0641 | 711/135 |
| 8,745,003 B1* | 6/2014 | Patterson | G06F 17/00 | 707/639 |
| 8,775,390 B2* | 7/2014 | Anglin | G06F 17/3015 | 707/693 |
| 8,799,595 B1* | 8/2014 | Chatterjee | G06F 11/1456 | 711/162 |
| 8,812,450 B1* | 8/2014 | Kesavan | G06F 3/0689 | 707/656 |
| 8,825,605 B2* | 9/2014 | Nayak | G06F 3/0613 | 707/662 |
| 8,832,034 B1* | 9/2014 | Ramarao | G06F 17/30156 | 707/664 |
| 8,832,035 B2* | 9/2014 | Raj | G06F 3/0608 | 707/662 |
| 8,843,719 B2* | 9/2014 | Benhase | G06F 3/061 | 711/103 |
| 8,849,767 B1* | 9/2014 | Zheng | G06F 3/0641 | 707/664 |
| 8,849,768 B1* | 9/2014 | Agrawal | G06F 17/30147 | 707/664 |
| 8,856,549 B2* | 10/2014 | Resch | G06F 17/30194 | 713/189 |
| 8,914,595 B1* | 12/2014 | Natanzon | G06F 3/0641 | 707/610 |
| 8,965,856 B2* | 2/2015 | Kawaguchi | G06F 3/0608 | 707/693 |
| 9,009,437 B1* | 4/2015 | Bjornsson | G06F 3/0665 | 370/389 |
| 9,110,839 B2* | 8/2015 | Strzelczak | G06F 11/14 | |
| 2003/0177109 A1* | 9/2003 | Cabrera et al. | 707/1 | |
| 2005/0163014 A1* | 7/2005 | Soeda | 369/84 | |
| 2006/0218346 A1* | 9/2006 | Nagumo et al. | 711/114 | |
| 2008/0140963 A1* | 6/2008 | Thomason et al. | 711/162 | |
| 2010/0106688 A1* | 4/2010 | Higuchi et al. | 707/640 | |
| 2011/0137867 A1* | 6/2011 | Nonaka | 707/649 | |
| 2012/0059986 A1* | 3/2012 | Kamiura et al. | 711/112 | |

FOREIGN PATENT DOCUMENTS

| | | |
|---|---|---|
| JP | 2010-102479 A | 5/2010 |
| JP | 2012-505461 A | 3/2012 |
| WO | 2009154272 A1 | 12/2009 |

* cited by examiner

--Related Art--

--Related Art--

--Related Art--

--Related Art--

--Related Art--

--Related Art--

--Related Art--

DATA DUPLICATION SYSTEM, DATA DUPLICATION METHOD, AND PROGRAM THEREOF

CROSS-REFERENCE TO RELATED APPLICATION

This application is based upon and claims the benefit of priority from Japanese patent application No. 2012-078758, filed on Mar. 30, 2012, the disclosure of which is incorporated herein in its entirety by reference.

BACKGROUND OF THE INVENTION

1. Field of the Invention

The present invention relates to a data duplication system preferable for a magnetic disk array subsystem and the like. More specifically, the present invention relates to a data duplication device which duplicates data by using a snapshot technique, and to a data duplication method as well as a program thereof.

2. Description of the Related Art

Recently, as the social infrastructure has come to be built on IT (information technology), the amount of data held by business enterprises and individuals has been increased drastically. Further, due to spread of online electronic commerce, legislation for keeping endorsement data, and the like, the quality and value of the data itself have become elevated. Under such circumstances, influences of having such incident of losing data have become widely known to the public. At the same time, a great attention is drawn to backup techniques as a means for preventing data loss in advance.

Here, a mirroring-type backup procedure employed in a disk array subsystem as a data duplication system will be described.

At first, an application of a database and the like making access to a master volume is stopped in order to secure the rest point of the volume (master volume) that is the target of backup. Then, a backup volume having the same capacity as that of the master volume is set, and the entire data of the master volume is copied to the backup volume.

When the copy is completed, the stopped application of the database is restarted. In the meantime, the data is read out from the backup volume and saved in a backup device such as a tape.

With the procedure described above, the backup volume is created and the data is copied to the backup volume from the master volume to the backup volume after stopping the application. However, there is also a method which shortens the time from the point where the rest point is secured to the point where the master volume and the backup volume are synchronized by creating the backup volume while the application is in operation and starting up the data copy from the master volume to the backup volume.

However, with any of those methods, a prescribed length of time according to the copy amount is required from the point where the point of rest is secured to the point where the data of the master volume is completely copied to the backup volume. Further, for the cases other than backup use such as data mining, for example, a plurality of backup volumes are often created for a same master volume. In such case, normally, the data amount that is several times larger than that of the master volume is required for the backup volume.

In order to avoid such issue of the mirroring method, recently, backup employing a snapshot method has been used frequently (see Japanese Unexamined Patent Publication 2005-208950 (Patent Document 1)). Here, an example of a disk array subsystem 100 that is a data duplication system employing the snapshot method that uses a shared pool will be described by referring to FIG. 9, FIG. 10, and FIG. 11.

The disk array subsystem 100 as the data duplication system employing the snapshot method includes: a master volume 101; a virtual volume (referred simply as "snapshot volume" hereinafter) 102 having a same capacity as that of the master volume but does not actually have a physical capacity; a volume (referred simply as "shared pool volume" hereinafter) 103 which stores data of the snapshot volume 102; a data duplication control module 104 which manages data accesses made to the snapshot volume 102; an address changing module 105 which manages the actual storing place of the duplicated data; a duplication control memory 200 and an address changing memory 300 provided to the data control module 104 and the address changing memory 105, respectively.

Among those, the duplication control memory 200 provided to the data duplication control module 104 includes: an attribute managing table 201 which manages the attributes of the volumes such as the snapshot volume and the like; a volume correspondence managing table 202 which holds the snapshot relations between the volumes; and a difference managing table 203 which manages differences between the master volume 101 and the snapshot volume 102.

Among those, the difference managing table 203 of the duplication control memory 200 takes value "0" when the snapshot volume 102 does not hold data, and takes value "1" when the snapshot volume 102 holds data.

Further, the address changing memory 300 includes: a directory 301 which holds the actual storing address of the snapshot volume 102; and an allotment managing table 302 which manages the use state of the shared pool volume.

Next, operations of the disk array subsystem (data duplication system) 100 mentioned above will be described by referring to FIG. 12, FIG. 13, and FIG. 14.

Here, LV (logical volume) 0 is used as the master volume 101, LV1 is used as the snapshot volume 102, and LV2 is used as the shared pool volume (referred to as "shared volume" hereinafter) 103. Further, it is assumed that data of (AA, BB, CC, DD, - - - , NN) are stored in the master volume 101 before receiving a snapshot command.

As the procedure for duplicating each volume 101 or 102 mentioned above, first, the shared volume 103 is set within the disk array subsystem 100 and the attribute managing table 201 and the allotment managing table 302 are initialized at a first step S701 as shown in a flowchart of FIG. 12.

That is, the share attribute is set to LV2 in the attribute managing table 201, value "0" which shows that the shared pool volume is in an unused state is set in the allotment managing table 302. Then, the master volume 101 and the snapshot volume 102 having a same storage capacity as that of the master volume 101 are set in step S702.

Further, when the disk array subsystem 100 receives a snapshot command in next step S703, the attribute managing table 201, the volume correspondence managing table 202, and the difference managing table 203 are initialized in step S403.

That is, a master attribute is set for the master volume (LV0) 101 and a snapshot attribute is set for the snapshot volume (LV1) 102 in the attribute managing table 201. LV1 is set for LV0 of the snapshot and LV0 is set for LV1 of the snapshot in the volume correspondence managing table 202, respectively, so as to show that the master volume (LV0) 101 and the snapshot volume (LV1) 102 are in a snapshot relation. Value "0" indicating that the snapshot volume in the difference managing table 203, i.e., LV1 in this case, does not hold data is set, and a null value is set in the directory 301 showing that a storage space of the shared volume is not allotted to the snapshot volume.

Next, described are processing procedures to be executed when the disk array subsystem (the data duplication system) 100 described in the volume duplication procedure receives a write command and a read command.

First, the processing procedure to be executed when a write command is received will be described. The microprocessor (simply referred to as CPU hereinafter) of the disk array subsystem 100 refers to the attribute managing table 201 of FIG. 10 in step S801 shown in FIG. 13. Subsequently, it is judged whether the received command is a command for the master volume or a command for the snapshot volume (FIG. 13: step S802).

Note here that the CPU is structured to function as an arithmetic calculation processing module including the data duplication control module 104 and the address changing module 105.

When judged in step S802 described above that it is a write command for the snapshot volume, the processing is ended without writing the data. This is the processing executed according to an operation with which the duplication of the master volume is to be maintained at the point where the snapshot volume receives the snapshot command, e.g., processing of a case of backup, for example. In other operation modes, the data may be written to the snapshot volume as requested by the write command.

In the meantime, when judged in step S802 that it is a write command for the master volume 101, the CPU then refers to the volume correspondence managing table 202 and specifies the snapshot volume 102 that makes a pair with the master volume (FIG. 13: step S803).

Then, it is judged whether or not there is data in the write request address of the specified snapshot volume 102 by referring to the difference managing table 203 (FIG. 13: steps S804, S805). When judged that there is data in the snapshot volume 102 (FIG. 13: step S805/Yes), the data is written to the master volume in step S509 and the processing is ended (FIG. 13: step S810).

When judged that there is no data in the snapshot volume 102 (FIG. 13: step S805/No), the allotment managing table 302 is then searched (FIG. 13: step S806), and a region to be used this time is determined from the unused regions of the shared pool volume 103.

Then, the existing data at the write request address of the master volume 101 is copied to the unused region of the shared pool volume (FIG. 13: step S807). Thereafter, value "1" indicating that the corresponding section of the allotment managing table 302 is being used is set, and the address of the unused region is set in the corresponding section of the directory 301 (FIG. 13: step S808).

Subsequently, value "1" indicating that there is data is set in the corresponding section of the difference managing table 203 (FIG. 13: step S809), the data is written to the master volume in step S509, and the processing is ended (FIG. 13: step S810).

Note here that FIG. 9, FIG. 10, and FIG. 11 show the states of each of the tables after a write command of (ZC) is issued to page 2 of the master volume (LV0) after receiving the snapshot command.

Next, the processing procedure to be executed when a read command is received will be described.

The CPU first refers to the attribute managing table 201 of the control memory 200 (FIG. 14: step S901), and judges whether the received command is for the master volume 101 or for the snapshot volume 102 (FIG. 14: step S902).

Then when judged in step S902 that it is the command for the master volume 101, the data is read out from the master volume 101 and the processing is ended (FIG. 14: steps S907, S908). In the meantime, when judged in step S902 described above that it is the command for the snapshot volume 102, the difference managing table 203 is then referred (FIG. 14: step S903) and it is judged in step S603 whether or not there is data in the readout request address of the snapshot volume 102 (FIG. 14: step S904).

When judged that there is the data in the snapshot volume 102, the directory 301 of the address changing memory 300 is referred (FIG. 14: step S906), and the address on the shared volume 103 at which the data is stored is acquired.

Subsequently, the data is read out from the shared volume 103 and transferred to the host, and the processing is ended (FIG. 14: steps S907, S908).

Further, when judged in step S902 described above that there is no data in the snapshot volume 102, the volume correspondence managing table 202 of the control memory 200 is referred in step S907, the data is read out from the master volume 101 that makes a pair with the snapshot volume 102, the readout data is transferred to the host in step S908, and the processing is ended. Here, the case of the snapshot method using the shared pool 103 is employed for the explanations. Other than such case, there is a method with which the snapshot volume 102 is created not with a virtual volume but with a normal volume, and the data is retracted to the snapshot volume without using the shared pool 103.

In such case, it is unnecessary to change the address from the virtual snapshot volume to the shared volume with this method. Thus, the processing can be simplified. However, when a plurality of snapshots are to be created, the disk capacity of several times larger than that of the master volume is used as in the case of mirroring. When executing backup with the snapshot method, it is necessary to determine the method by considering the advantages and disadvantages of those methods.

Further, other than Patent Document 1 described above, known as the related techniques are Patent Documents 2 and 3 mentioned below.

Out of those, the technique disclosed in Patent Document 2 (Japanese Unexamined Patent Publication 2002-373093) is known as a technique related to managing snapshot differences. The technique disclosed in Patent Document 3 (WO 2009/154272) is a version managing system targeted at image files regarding virtual machines, which is known as a system that makes it possible to refer to the differences between the versions.

The snapshot volume 102 acquired by the method disclosed in Patent Document 1 described above is used for various purposes. For example, as the used methods for backup, there is a method with which the duplication of the master volume updated as needed is acquired regularly and the image of the master volume 101 at a certain point is restored from the snapshot volume 102 as necessary. There is also a method with which the image of the master volume 101 at a certain point is backed up in a secondary backup device such as a magnetic tape through the snapshot volume 102.

Further, as a secondary use purpose of the data, there is also a use method with which a new development work is executed based on actual work data by utilizing the acquired snapshot volume 102. In the case of the secondary use, update may occur in the snapshot volume in some cases.

In the meantime, in a case where update occurs in the snapshot volume 102 while the generations of a plurality of snapshot volumes 102 are being managed, it takes time for the update processing in order to hold the snapshot volumes 102 between the generations.

Now, there is considered a case where data update occurs for page 2 of the snapshot volume LV12 in the state shown in FIG. 15.

When there is update of data "HH" occurred in page 2 of the snapshot volume LV12, it becomes necessary to execute processing for retracting the data of "CC" of page 2 of LV12 to page 2 of LV11 in order to hold the volume image of LV11. Therefore, the data update processing for the snapshot volume becomes degraded in terms of the performance compared to that of the update processing for the master volume.

Further, with the technique depicted in Patent Document 1 described above, it is unnecessary to change the address from the virtual snapshot volume to the shared volume. Thus, the processing is simplified. However, when a plurality of snapshots are to be created, the disk capacity of a plurality of times larger than that of the master volume is used as in the case of mirroring.

Furthermore, with each of Patent Documents 1 to 3 described above, there is always a load imposed upon the master volume especially when executing write command processing for the snapshot volume (the duplication volume) from the host.

It is therefore an exemplary object of the present invention to improve the inconveniences of the related techniques and, more specifically, to provide a data duplication system, a data duplication method, and a program thereof with which data update processing of the snapshot volume as a duplication volume can be executed smoothly without imposing a load on the master volume at the time of executing write command processing inputted from outside and with which the usability of the duplication volume can be improved thereby.

In order to achieve the foregoing object, the data duplication system according to an exemplary aspect of the invention is a snapshot-type data duplication system which includes: duplication volumes having a same capacity as that of a master volume; a shared pool volume which stores duplication data of the duplication volumes; and a main control unit which manages data accesses for the duplication data made from outside (a host computer) to the duplication volumes and manages a storing place of the duplication data, wherein the main control unit includes a data duplication control module which manages data accesses made from outside to the duplication volume, and an address changing module which manages the storing place of the duplication data.

Further, the data duplication control module includes a data duplication update processing function which duplicates data of the master volume to the duplication volume when updating the master volume, and directly updates the data of the duplication volume when updating the data of the duplication volume.

In order to achieve the foregoing object, the data duplication method according to another exemplary aspect of the invention is a data duplication method used in a snapshot-type data duplication system which includes duplication volumes for a master volume, a shared pool volume which stores duplication data of the duplication volumes, and a main control unit which manages data accesses for the duplication data made from outside (a host computer) to the duplication volumes and manages a storing place of the duplication data, and the method includes: judging whether or not update processing for the duplication volume is already executed by referring to an update managing table set in advance, when a write command for the duplication volume is inputted (an update processing judging step); specifying an address of the shared pool volume allotted in advance to the duplication volume as a target of the write command and writing data that corresponds to the write command thereto, when judged in the update processing judging step that there is a difference in the duplication volume (a shared volume writing step/a first step); and storing, to a prescribed memory, the address allotted on the shared volume that is a reference target of the update data of the duplication volume in a step of writing to the shared volume, and registering data showing that there is update data in the duplication volume to a corresponding section of the update managing table (an update data reference target registering step), wherein each processing content of judgment, writing, and registration done in each of the steps is executed by the main control unit successively.

In order to achieve the foregoing object, a data duplication method according to still another exemplary aspect of the invention is a data duplication method used in a snapshot-type data duplication system which includes duplication volumes for a master volume, a shared pool volume which stores duplication data of the duplication volumes, and a main control unit which manages data accesses for the duplication data made from outside (a host computer) to the duplication volumes and manages a storing place of the duplication data, and the method includes: judging whether or not update processing for the duplication volume is already executed by referring to an update managing table set in advance, when a write command for the duplication volume is inputted (an update processing judging step): searching a vacant region of the shared volume by referring to an allotment managing table set in advance, when judged in the update processing judging step that there is no difference (no update) in the duplication volume (a vacant region searching step); writing data that corresponds to the write command to the vacant region, when the vacant region of the shared pool volume is found in the vacant region searching step (a shared volume writing step/a second step); storing, to a prescribed memory, an address allotted on the shared volume that is a reference target of the update data of the duplication volume in the shared volume writing step, and registering data showing that there is update data in the duplication volume to a corresponding section of the update managing table (an update data reference target registering step), wherein each processing content of judgment, searching, writing, and registration done in each of the steps is executed by the main control unit. In order to achieve the foregoing object, the data duplication program according to still another exemplary aspect of the invention is a data duplication method is used in a snapshot-type data duplication system which includes duplication volumes for a master volume, a shared pool volume which stores duplication data of the duplication volumes, and a main control unit which manages data accesses for the duplication data made from outside (a host computer) to the duplication volumes and manages a storing place of the duplication data, and the program includes: an update processing judging function for judging whether or not update processing for the duplication volume is already executed by referring to an update managing table set in advance, when a write command for the duplication volume is inputted: a shared pool volume writing processing function (a first writing processing function) for specifying an address of the shared volume allotted in advance to the duplication volume as a target of the write command and writing data that corresponds to the write command thereto, when judged by the update processing judging function that there is a difference in the duplication volume; and an update data reference target registering processing function for storing, to a prescribed memory, the address allotted on the shared volume that is a reference target of the update data of the duplication volume by the shared pool volume writing processing function (the first processing function) and for registering data showing that there is update data in the duplication volume to a corresponding section of the update managing table, wherein each processing content of judgment, writing, and registration done in each of the processing functions is executed by a computer that is provided to the main control unit.

In order to achieve the foregoing object, the data duplication program according to still another exemplary aspect of the invention is a data duplication method is a data duplication processing program used in a snapshot-type data duplication system which includes duplication volumes for a master volume, a shared pool volume which stores duplication data of the duplication volumes, and a main control unit which manages data accesses for the duplication data made from outside (a host computer) to the duplication volumes and manages a storing place of the duplication data, and the program includes: an update processing judging function for judging whether or not update processing for the duplication volume is already executed by referring to an update managing table set in advance, when a write command for the duplication volume is inputted: a vacant region search processing function for searching a vacant region of the shared volume by referring to an allotment managing table set in advance, when judged by the update processing judging function that there is no difference (no update) in the duplication volume; a shared volume writing processing function (a second processing function) for writing data that corresponds to the write command to the vacant region, when the vacant region of the shared volume is found by the vacant region search processing function; and an update data reference target registering processing function for storing, to a prescribed memory, an address allotted on the shared volume that is a reference target of the update data of the duplication volume by the shared volume writing processing function, and for registering data showing that there is update data in the duplication volume to a corresponding section of the update managing table, wherein each processing content of judgment, searching, writing, and registration done in each of the processing functions is executed by a computer that is provided to the main control unit.

DETAILED DESCRIPTION OF THE PREFERRED EMBODIMENTS

Hereinafter, an exemplary embodiment of a case where the data duplication system according to the present invention is applied to a disk array subsystem will be described by referring to FIG. 1 to FIG. 8.

The basic structural contents of the exemplary embodiment will be described first, and the specific contents thereof will be described thereafter.

(Basic Structure)

Figure 1:
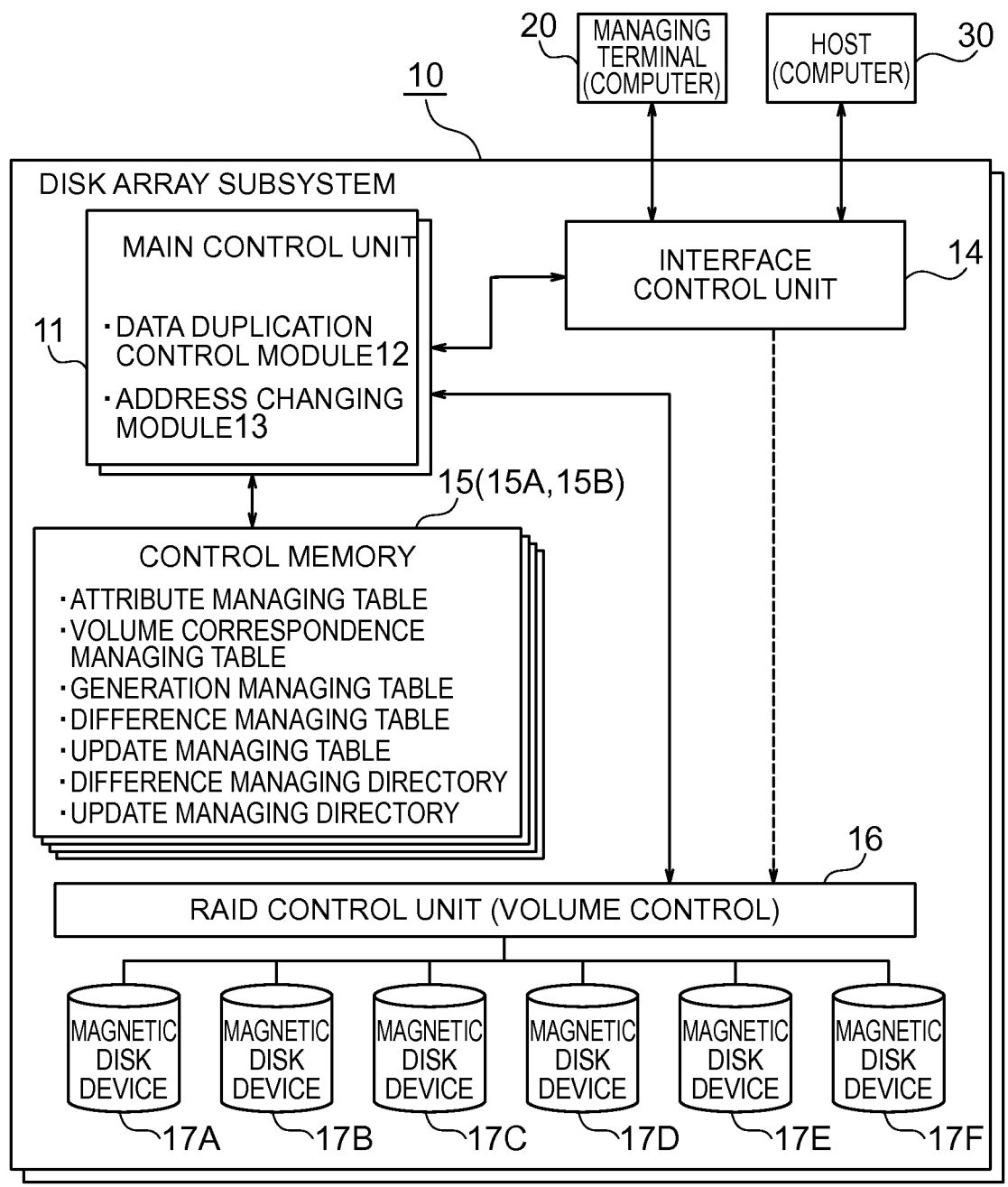
FIG. 1 is a functional block diagram showing an exemplary embodiment of a data duplication system according to the present invention.

FIG. 1 is a functional block diagram which shows the outline of the hardware structure of the data duplication system (the disk array subsystem).

In FIG. 1, the data duplication system 10 allots a plurality of magnetic disk devices 17A, 17B, 17C, - - - , 17F for a managing terminal 20 and a host computer (simply referred to as "host" hereinafter) 30 as the host devices and performs processing such as backup of data and the like. The data duplication system 10 includes an interface control unit 14 used for connection between the host devices 20 and 30 and a RAID control unit (volume control unit) 16 for connecting the interface control unit 14 and each of the plurality of magnetic disk devices 17A to 17F.

Among those, input and output of data for the interface control unit 14 and the RAID control unit 16 are controlled by a microprocessor (main control unit) 11 which operates based on control programs stored in the control memories 15 (15A, 15B).

Further, through rewriting the control programs stored in the control memories 15, it is possible to utilize the main control unit 11 as a means for achieving various functions. Here, the main control unit 11 is structured by including a data duplication module 12 which controls duplication of the data and accesses made to the duplicated data and also an address changing module 13.

Further, an attribute managing table 21, a volume correspondence managing table 22, a difference managing table 24, and an update managing table 25 as the features of the exemplary embodiment are stored and held in the control memories 15 as will be described later.

FIG. 1 shows the case where six magnetic disk devices 17A to 17F are connected. However, in actual cases, each of those does not necessarily constitute a logically independent volume, e.g., a master volume, a snapshot volume, or a shared pool volume. It is possible to provide apparently a single volume over a plurality of magnetic disk devices under control of the RAID control unit 16 or to provide apparently a plurality of volumes within a single magnetic disk device by setting partitions within the single magnetic disk device.

Figure 2:
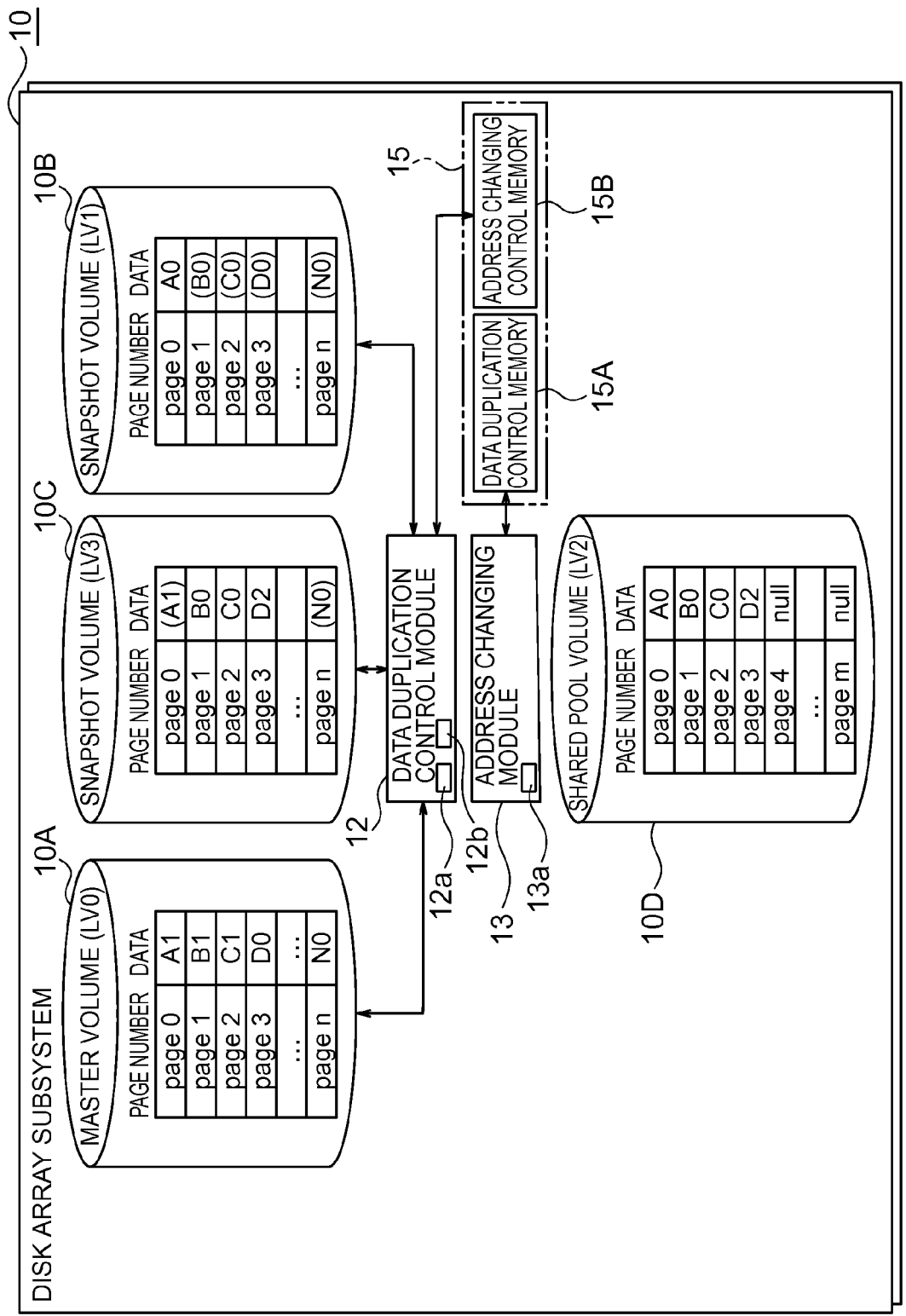
FIG. 2 is a functional block diagram which shows a state where a master volume is specified based on a plurality of magnetic disk devices disclosed in FIG. 1, which is then virtually rearranged by a duplication volume (snapshot volume) and a shared pool volume corresponding thereto, and shows the control system thereof.

As shown in FIG. 1, in order to achieve the object, the exemplary embodiment is so designed that a master volume 10A, snapshot volumes (referred to as "duplication volumes" hereinafter) 10B (10C) or a shared pool volume (referred to as "shared volume" hereinafter) 10D shown in FIG. 2 are set under the control of the main control unit 11 and the RAID control unit 16.

That is, as shown in FIG. 1 and FIG. 2, the data duplication system 10 of the exemplary embodiment is a snapshot-type data duplication system which includes: the master volume 10A; the duplication volumes 10B (10C) having the capacity same as that of the master volume; the shared volume 10D which stores the duplication data of the duplication volumes 10B (10C); and the main control unit 11 which manages data accesses for the duplication data made from an external computer (a host computer) to the duplication volumes 10B (10C) and manages the place for storing the duplication data.

As described above, the main control unit 11 is structured by including the data duplication control module 12 which manages data accesses made from the external host to the duplication volumes 10B (10C) and the address changing module 13 which manages the place for storing the duplication data.

Out of those, the data duplication control module 12 includes a data duplication update processing function which duplicates the data of the master volume 10A to the duplication volumes 10B (10C) when updating the master volume 10A and directly updates the data of the duplication volumes 10B (10C) when updating the data of the duplication volumes 10B (10C). Further, the data duplication control module 12 in the exemplary embodiment is provided with the data duplication control memory 15A which includes: the difference managing table 24 for managing that the data is duplicated to the duplication volume 10B (10C) from the master volume 10A; and the update managing table 25 for managing that the update of data duplication is executed directly to the duplication volumes 10B (10C) (see FIG. 3).

Further, the data duplication control module 12 is structured to execute the data duplication update processing function based on the information stored in the data duplication control memory 15A. Further, the address changing module 13 is provided with the address changing control memory 15B which includes an allotment managing table for managing the use state of the shared volume 10D.

Further, the above-described control memory 15 is constituted with the address changing control memory 15B and the above-described data duplication control memory 15A (see FIG. 2).

Figure 3:
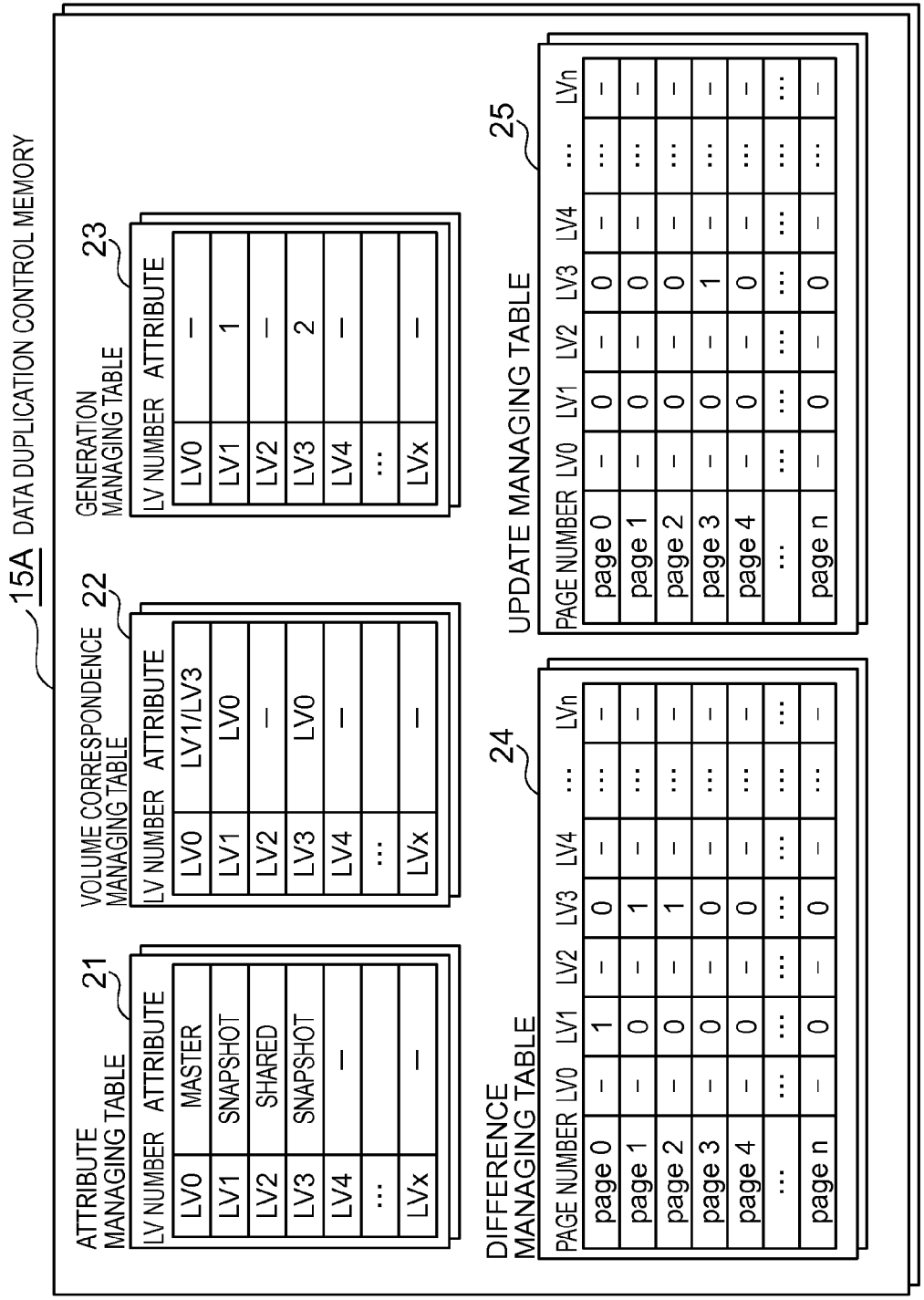
FIG. 3 is an explanatory chart showing a specific example of a data duplication control memory disclosed in FIG. 1.
Figure 4:
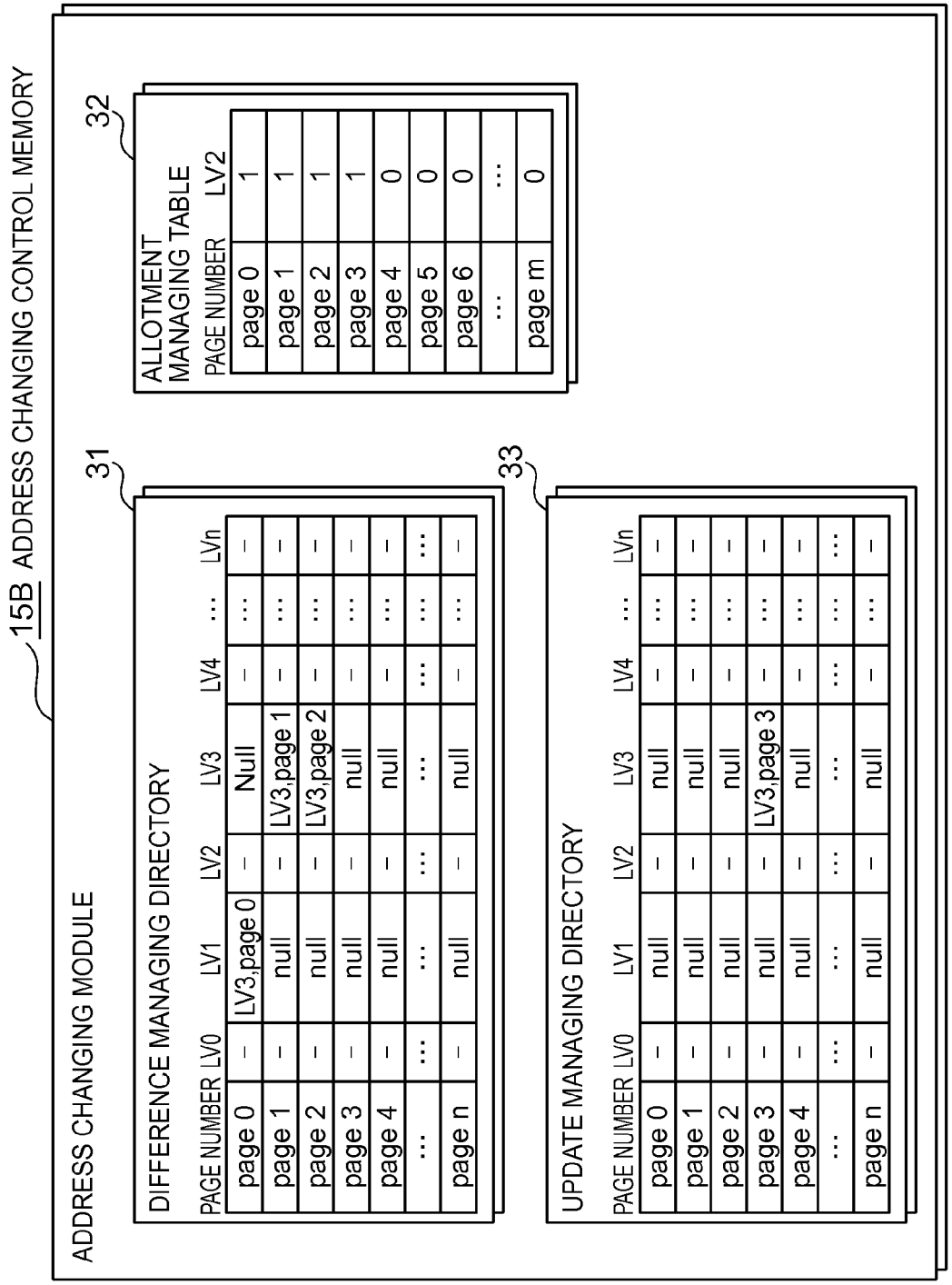
FIG. 4 is an explanatory chart showing a specific example of an address changing control memory disclosed in FIG. 1.

Further, the data duplication control memory 15A includes: the volume correspondence managing table 22 for managing the pair relationship between the above-described master volume 10A and the duplication volumes 10B (10C); and the generation managing table 23 for executing the chronological generation management of the duplication volumes 10B (10C) (see FIG. 3).

Therefore, for the write command processing inputted from outside in the exemplary embodiment, the main control unit 11 and the control memories 15 provided therewith function effectively as described above so as to smoothly perform data update processing of the duplication volumes (snapshot volumes) 10B (10C) without imposing a load on the master volume 10A. At the same time, the usability of the duplication volumes 10B (10C) can be improved thereby.

When executing the data duplication update function, the exemplary embodiment is structured not to execute duplication of the data to the other duplication volume 10C when updating the data of the duplication volume 10B out of the plurality of duplication volumes 10B (10C).

Further, for executing a readout request from the outside (the host computer) to the duplication volume 10B (10C), the data duplication control module 12 includes a read data readout restricting function which, with respect to a first data read out from a given duplication volume 10B out of the plurality of duplication volumes 10B (10C), sets a second data read out from the other duplication volume 10C via the given duplication volume 10B as the data of different content from that of the first data.

Thereby, smooth operations of the entire system can be secured, so that useless data duplication by executing duplicated operations can be avoided.

Further, in the exemplary embodiment, the address changing control memory 15B stores a difference managing directory 31 which holds the storing addresses of the actual data of each of the duplication volumes 10B (10C), and an update managing directory 33 which holds the actual data address when direct update of each of the duplication volumes 10B (10C) occurs. At the same time, the above-described address changing module 13 includes a duplicated data storing place managing function which manages the duplicated data storing places based on the information stored in the address changing control memory 15B (see FIG. 4). Thereby, the presence of the stored data can be displayed externally clearly.

(Specific Contents)

Hereinafter, this will be described in more details.

As shown in FIG. 2, the data duplication system 10 in this exemplary embodiment includes: the master volume 10A which stores the duplication origin data; the duplication volumes 10B (10C) for the master volume 10A; the shared volume 10D as the data storing place for the duplication volumes 10B (10C); the above-described data duplication control module 12 which manages data accesses made to the duplication volumes 10B (10C); and the above-described address changing module 13 which manages the actual storing place of the duplication data. There is no specific limit set for the number of the master volumes 10A and the duplication volumes 10B (10C).

FIG. 2 shows the state where the data duplication module 12 creates the duplication volume (LV1) 10B when data of (A0, B0, C0, D0, - - -, N0) are held in order from Page 0 in the master volume (LV0) 10A and shows the state where, thereafter, the data of Page 0 of the master volume (LV0) 10A is updated to A1, the data duplication module 12 creates the duplication volume (LV3) 10C again, the data of Page 1 of the master volume (LV0) A1 is updated to B1, the data of Page 2 is updated to B2, respectively, and D2 is directly updated to Page 3 of the duplication volume (LV3) 10C.

The data duplication control module 12 is provided with the data duplication control memory 15A which includes: the attribute managing table 21 which manages the volume attributes such as the master attribute and the snapshot attribute; the volume correspondence managing table 22 which manages the pair relationship between the master volume 10A and the duplication volumes 10B (10C); the generation managing table 23 which executes generation management of the duplication volumes 10B (10C); the difference managing table 24 which manages that data duplication is executed to the duplication volumes 10B (10C) when updating the master volume 10A; and the update managing table 25 which manages that data is updated directly to the duplication volumes 10B (10C).

Further, the address changing module 13 is provided with the address changing control memory 15B which includes: the difference managing directory 31 which holds the storing addresses of the actual data of each of the duplication volumes 10B (10C); the update managing directory 33 which holds the actual data address when direct update of each of the duplication volumes 10B (10C) occurs; and the allotment managing table 32 which manages the use state of the shared volume 10D.

Operations of Exemplary Embodiment

Next, operations of the data duplication system 10 according to the exemplary embodiment will be described by referring to a flowchart of FIG. 5.
(Create Shared Volume)

First, as the advance preparations for the snapshot operation, it is necessary to create the shared volume 10D. In this case, first, the main control unit 11 operates based on a command from the host device (management terminal 20), and creates the shared volume 10D according to a program set in advance (FIG. 5: step S101).

Figure 5:
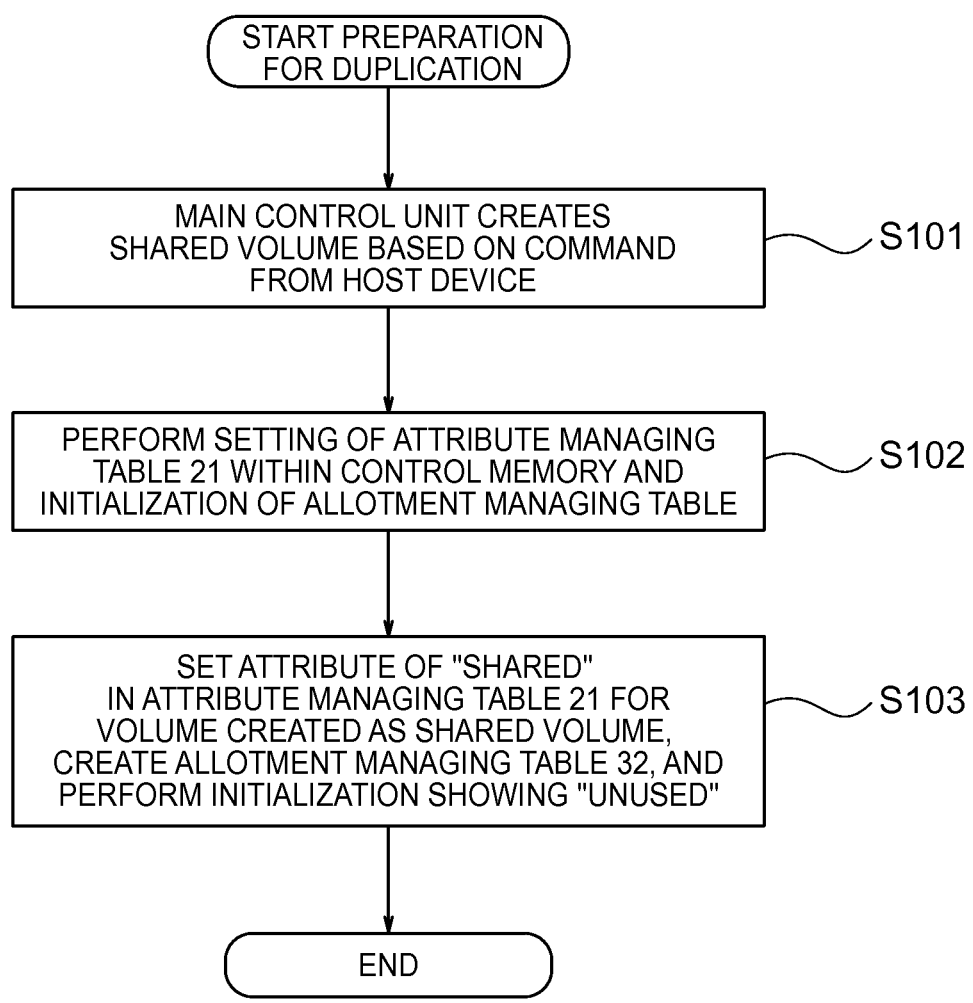
FIG. 5 is a flowchart showing a preparatory operation when performing duplication in the exemplary embodiment disclosed in FIG. 1.

Subsequently, the main control unit 11 performs setting of the attribute managing table 21 within the data duplication control memory 15A and initialization of the allotment managing table 32 within the address management control memory 15B (FIG. 5: step S102). Then, an attribute of "shared" is set in the attribute managing table 21 for the volume created as the shared volume 10D, the allotment managing table 32 is created thereafter, and initialization is performed with "0" which shows that it is being unused (FIG. 5: step S103).

Figure 6:
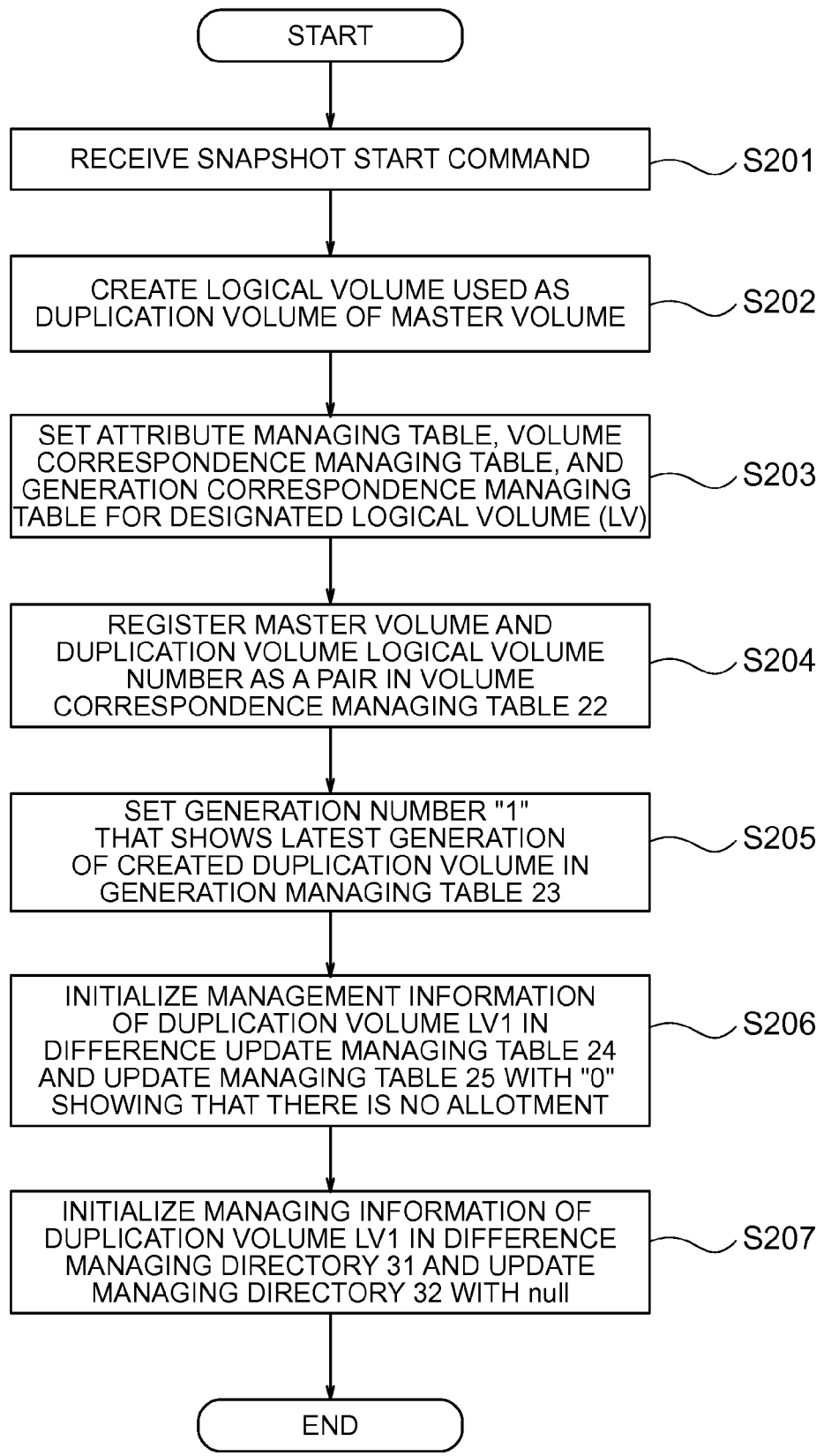
FIG. 6 is a flowchart showing snapshot start command receiving processing of the exemplary embodiment disclosed in FIG. 1.

After creating the shared volume in step S101, snapshot can be started upon receiving a snapshot start command as shown in FIG. 6.

Herein, an explanation is provided by referring to a case where LV0 is designated as the master volume and LV1 is designated as the duplication volume 10B (10C).
(Snapshot Start Command)

Upon receiving a snapshot start command (FIG. 6: step S201), logical volumes used as the master volume 10A and the duplication volumes 10B (10C) are then created and the various tables are set (FIG. 6: steps S202, S203).

Specifically, the master attribute and the snapshot attribute are set in the attribute managing table 21 of the created logical volumes, the logical volume numbers of the master volume 10A and the duplication volume 10B (10C) as a pair are registered in the volume correspondence managing table 22 (FIG. 6: step S204), and a generation number "1" showing that the created duplication volume 10B (10C) is the latest generation is set in the generation managing table 23 (FIG. 6: step S205).

Subsequently, management information of LV1 created as the duplication volume 10B (10C) is initialized to "0" showing that there is no allotment to the duplication volume 10B in the difference update managing table 24 and the update managing table 25 (FIG. 6: step S206), and management information of LV1 created as the duplication volume 10B is initialized to "null" in the difference managing directory 31 and the update managing directory 32 (FIG. 6: step S207). In the volume correspondence managing table 22, the logical volume of the duplication volume 10B as the pair is registered in the section of the logical volume designated as the master volume 10A, and the logical volume of the master volume 10A is registered in the section of the logical volume designated as the duplication volume 10B.

Further, here, the logical volume LV1 of the duplication volume 10B is stored in the section of the master volume LV0, and LV0 as the logical volume of the master volume 10A is stored in the section of LV1 of the duplication volume 10B.

Thereafter, LV1 of the duplication volume 10B holds the volume image of the master volume LV0 at the point where the snapshot command is received.

Here, the explanation is provided by referring to the case where the master volume LV0 performs setting of the snapshot pair for the first time with the duplication volume LV1. In a case where the duplication volume is created for the already-set master volume 10A and LV3 is added anew after setting of the snapshot is done for LV0 and LV1, for example, the duplication volume LV3 added anew is added to the section of LV0 in the volume correspondence managing table 22. Further, in the generation managing table 23, the generation number "1" showing that it is the latest generation is set for the generation number of the duplication volume LV3 created anew. The generation number of LV1 that has already been created is updated from "1" to "2", and it is handled as a duplication volume that is one generation older.
(Write Command Processing)

Next, write command processing generated after receiving the snapshot command will be described by referring to a flowchart shown in FIG. 7.

Figure 7:
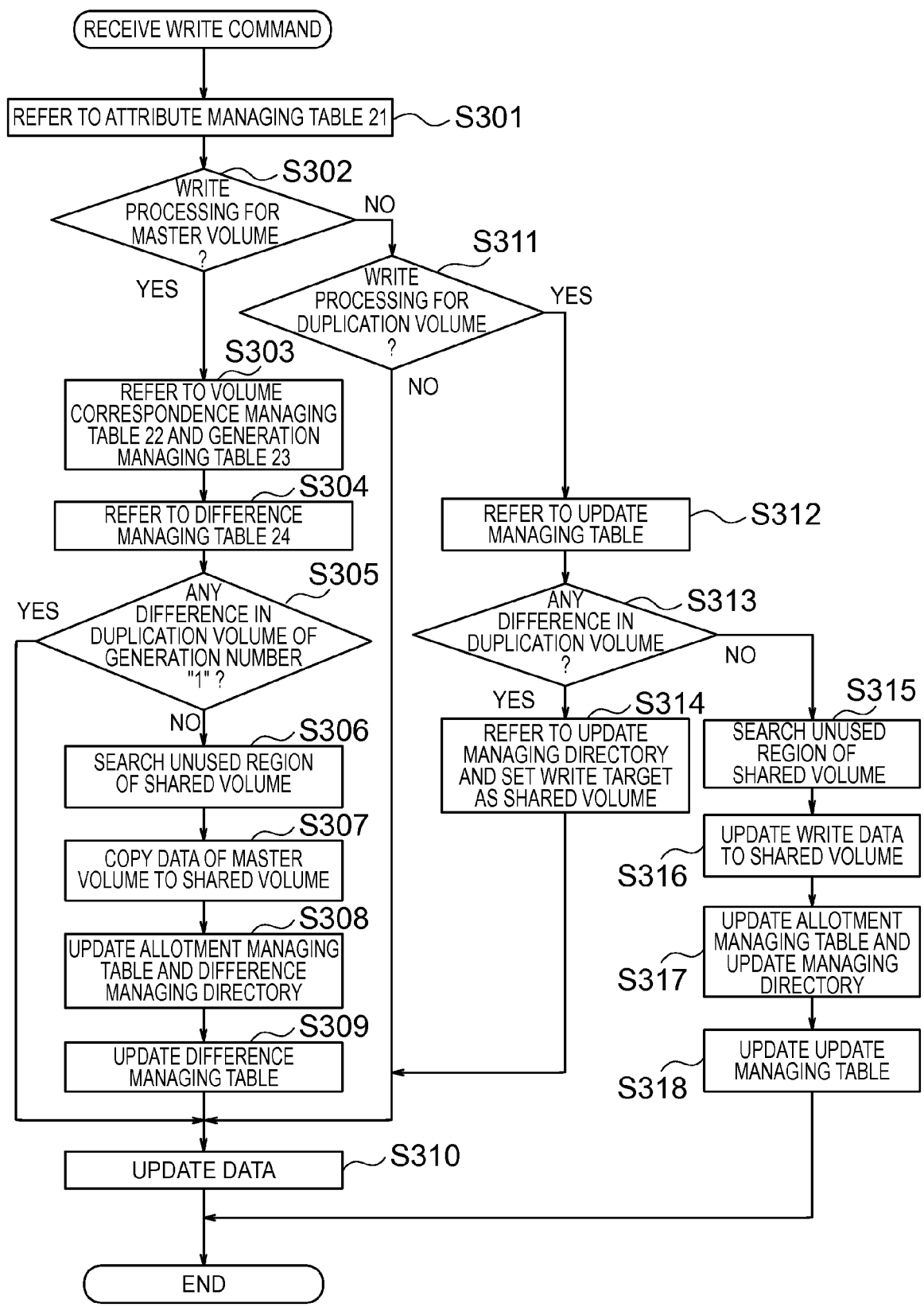
FIG. 7 is a flowchart showing an operation procedure for a write command from outside according to the exemplary embodiment disclosed in FIG. 1.

First of all, the main control unit 11 refers to the attribute managing table 21 (FIG. 7: step S301), and judges whether or not the write command target volume has the master attribute (FIG. 7: step S302). When judged that it is the write command processing for the master volume 10A (FIG. 7: step S302/Yes), the main control unit 11 refers to the volume correspondence managing table 22 and the generation managing table 23 to specify the duplication volume 10B which has the write-command target logical volume in the master volume 10A and has the generation number of "1" (FIG. 7: step S303).

Then, the difference managing table 24 is referred in step S303 to judge whether or not there is already a difference in the duplication volume 10B in the range of the write target (FIG. 7: steps S304, S305/an update processing judging step). When it is judged here that there is already a difference (FIG. 7: step S305/Yes), the write data is written to the master volume of the write-command target to update the data (FIG. 7: step S310) and the write command is ended since it is not necessary to retract the data of the master volume to the duplication volume 10B. In the meantime, when judged in step S305 of FIG. 7 that there is no difference in the duplication volume 10B having the generation number of "1" (FIG. 7: step S305/No), it is necessary to hold, in the duplication volume 10B, the volume image of the master volume 10A at the instant where the snapshot command is received. Therefore, a vacant region of the shared volume is searched by referring to the allotment managing table 32 (FIG. 7: step S306/a vacant region searching step), and the data of the corresponding section of the master volume 10A is copied to the vacant region of the shared volume 10D (FIG. 7: step S307/a shared volume writing step).

Subsequently, the section in the allotment managing table 32 where the data is allotted by copy of this time is updated to "1" which means that there is an allotment, and the corresponding section in the difference managing directory 31 of the duplication volume 10B is updated so as to indicate the region allotted on the shared volume 10D this time as the reference target of the data of the duplication volume 10B (FIG. 7: step S308/a data referring target registering step).

Next, "1" is set in the corresponding section of the difference managing table 24 for showing that there is a difference in the duplication volume (FIG. 7: step S309). Then, after completing the retract of the data from the master volume 10A to the duplication volume 10B, write data is written to the master volume 10A that is the write-command target (FIG. 7: step S310), and the write command is ended.

Further, when judged in step S302 of FIG. 7 that it is not the write command for the master volume 10A, it is then judged whether or not the write-command target volume of this time has the snapshot attribute (FIG. 7: step S311).

When judged here that it does not have the snapshot attribute (FIG. 7: step S311/No), the write-command target volume is a volume that is irrelevant to the snapshot processing. Thus, the write data is written to the write-command target volume for update (FIG. 7: step 310), and the write command is ended.

In the meantime, when judged in step S311 of FIG. 7 that it has the snapshot attribute (FIG. 7: step S311/Yes), the update managing table 25 is referred in step S311 (FIG. 7: step S312) and it is judged whether or not update processing for the duplication volume 10B has already been done (FIG. 7: step S313/an update processing judging step).

When judged in step S313 that the corresponding section of the update managing table 25 is set as "1" and judged that there is a difference in the duplication volume 10B (FIG. 7: step S313/Yes), the update managing directory 33 is referred, the address of the shared volume 10D already allotted to the duplication volume 10B is referred, and the address of the shared volume 10D is taken as the write-command target of this time (FIG. 7: step S314).

Thereafter, the write data is written to the shared volume for update (FIG. 7: step S310/a shared volume writing step). After checking the update registration of the update data reference target, the write command is ended.

Further, when judged in step S313 of FIG. 7 described above that update is not done in the snapshot volume (FIG. 7: step S313/No), the allotment managing table 32 is referred to search a vacant region of the shared volume (FIG. 7: step S315/a vacant region searching step), and write data is written to the found vacant region (FIG. 7: step S316/a shared volume writing step). Thereafter, the section in the allotment managing table 32 where the data is allotted by copy of this time is updated to "1", and the corresponding section in the update managing directory 33 of the snapshot volume is updated so as to indicate the region allotted on the shared volume this time as the reference target of the update data of the snapshot volume (FIG. 7: step S317). At the same time, "1" is set to the corresponding section in the update managing table 25 in order to show that there is update data in the duplication volume 10B (FIG. 7: step S318/an update data reference target registering step), and the write command processing is ended.

As described, through executing the write command processing in the manner described above, it becomes possible to perform the write command processing for the duplication volume 10B while imposing no load upon the master volume 10A.

(Read Command Processing)

Next, read command processing generated after receiving the snapshot command will be described by referring to a flowchart shown in FIG. 8.

Figure 8:
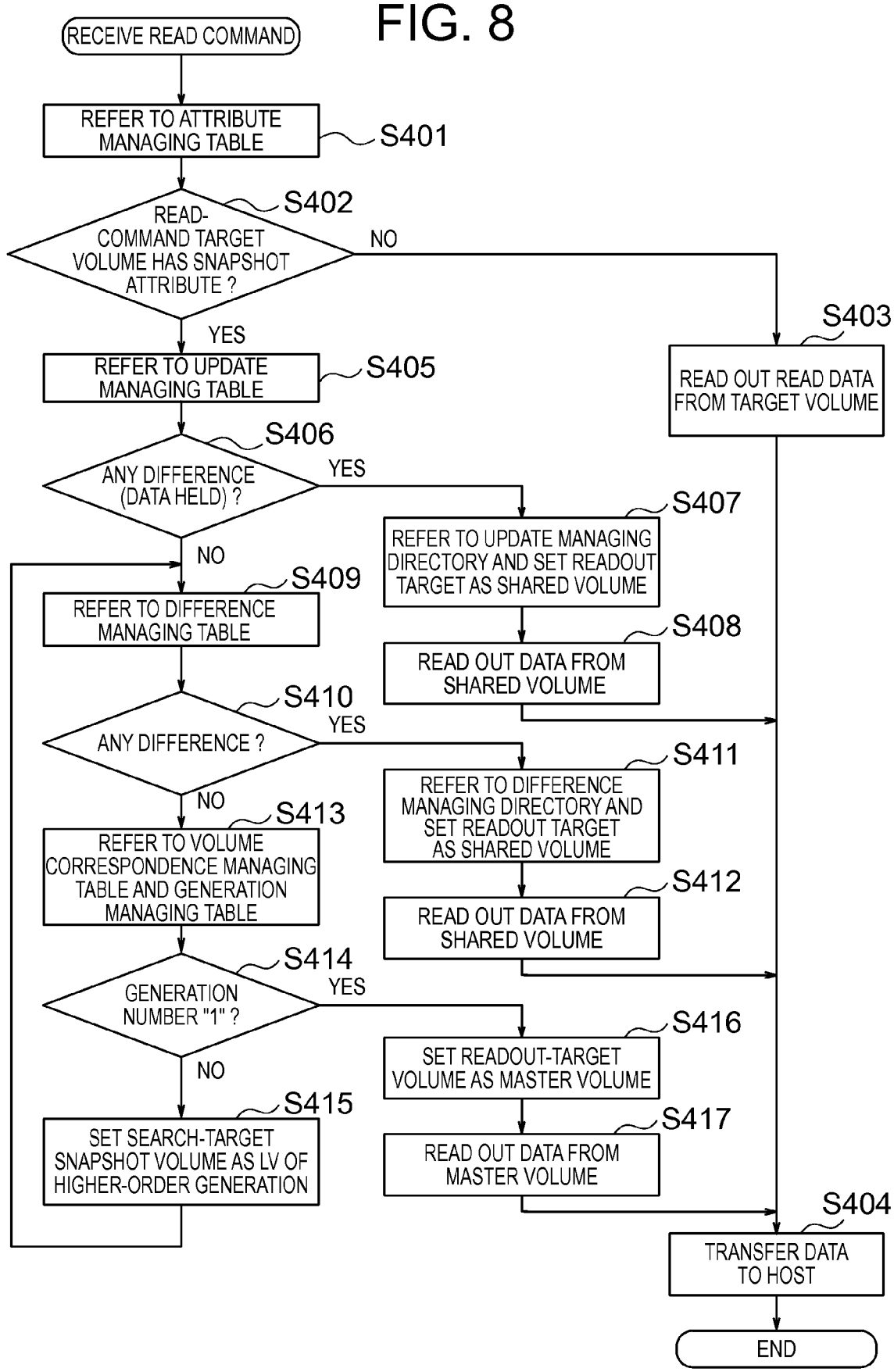
FIG. 8 is a flowchart showing an operation procedure for a read command from outside according to the exemplary embodiment disclosed in FIG. 1.
Figure 9:
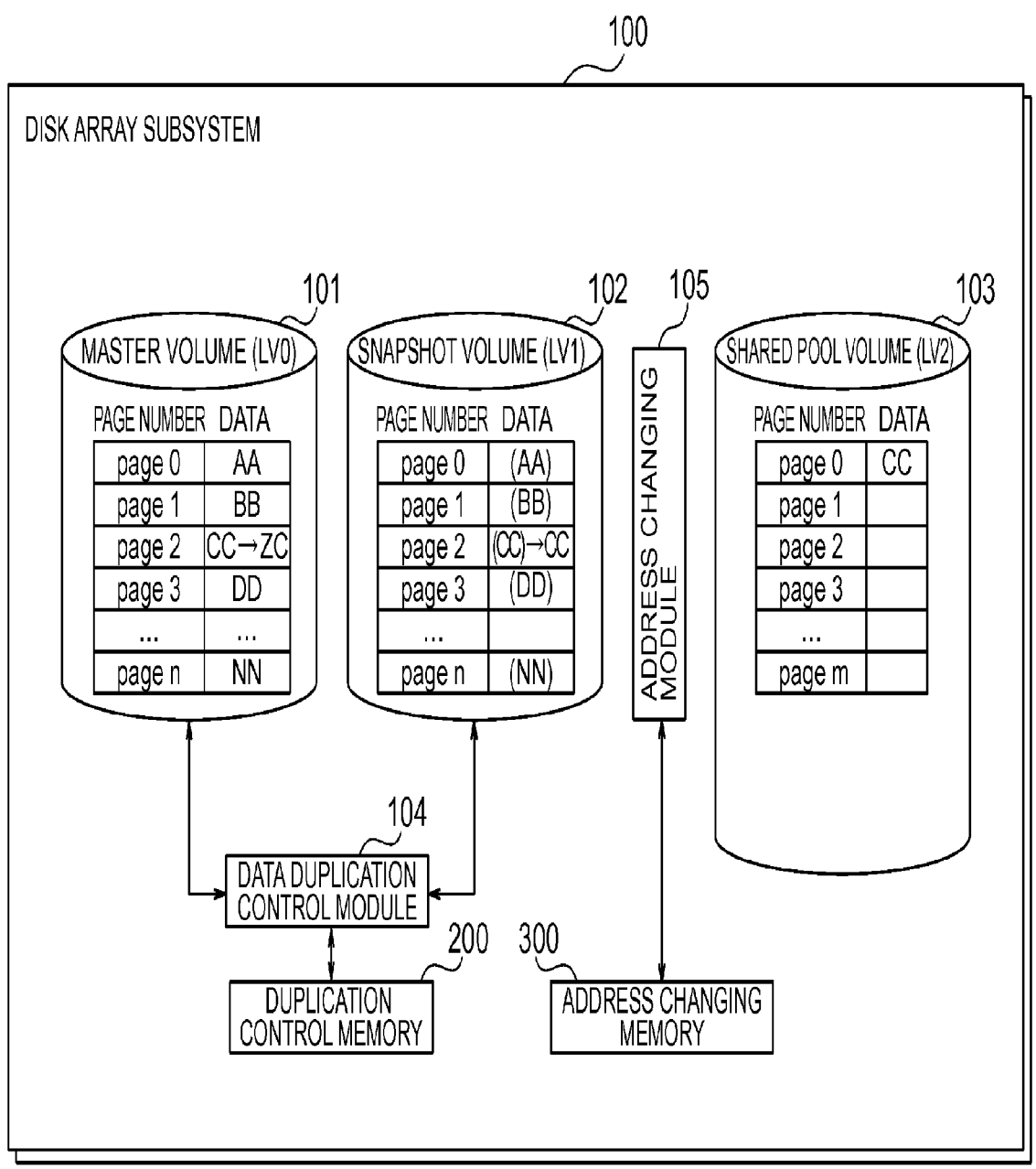
FIG. 9 is a functional block diagram showing an example of a snapshot operation of a data duplication system according to a related art technique.
Figure 10:
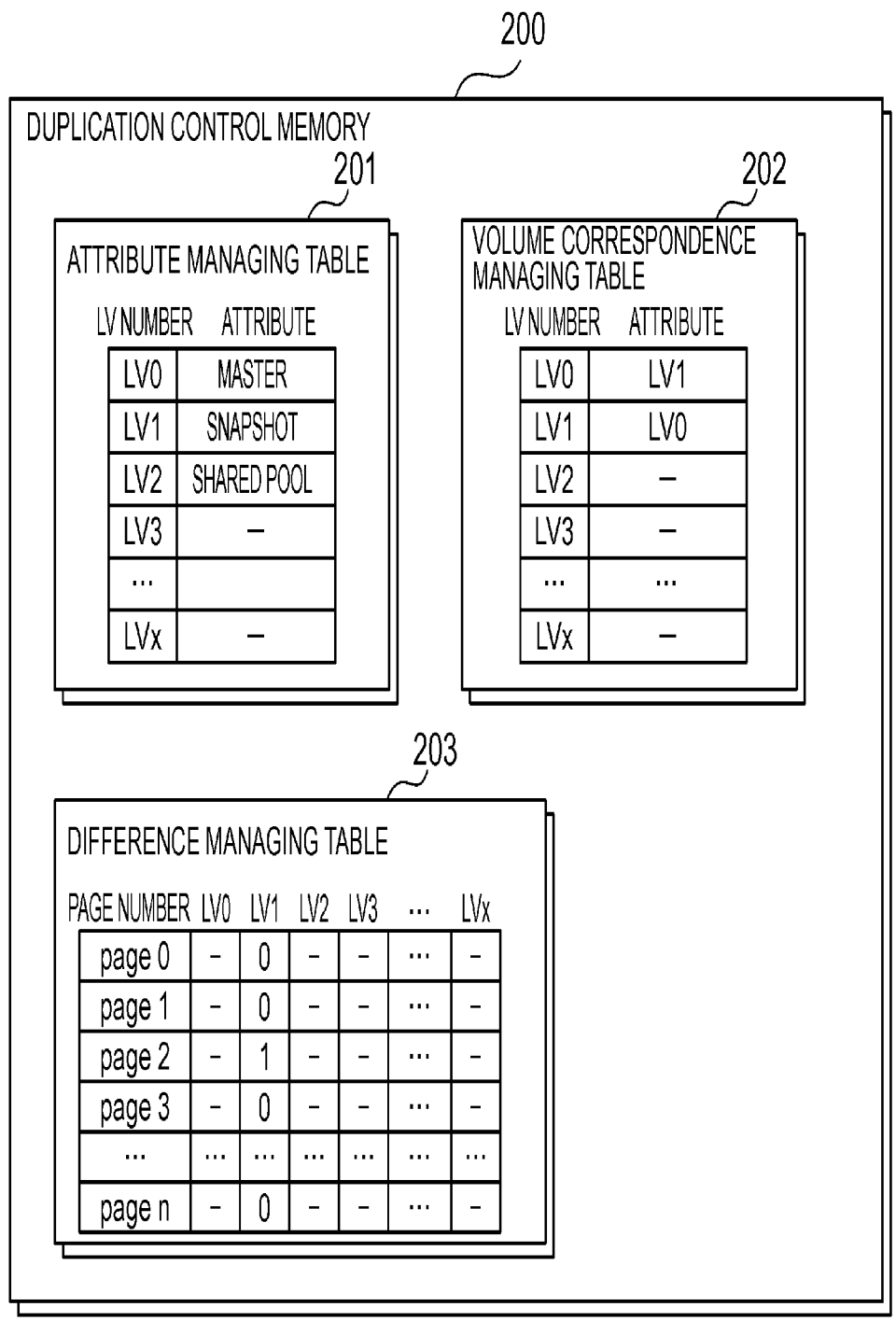
FIG. 10 is an explanatory chart showing a specific example of a data duplication control memory provided to the system according to the related art technique disclosed in FIG. 9.
Figure 11:
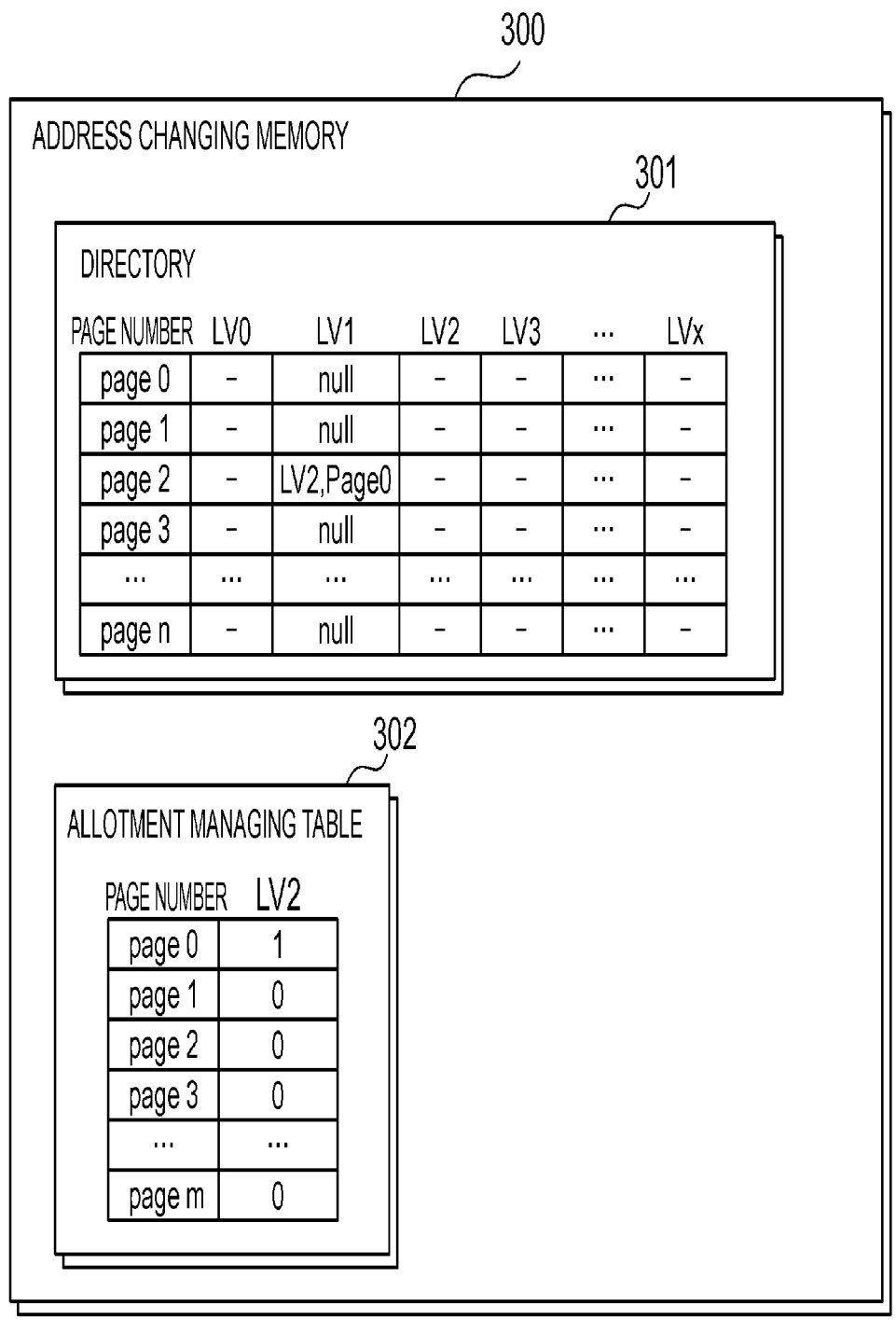
FIG. 11 is an explanatory chart showing a specific example of an address changing control memory provided to the system according to the related art technique disclosed in FIG. 9.
Figure 12:
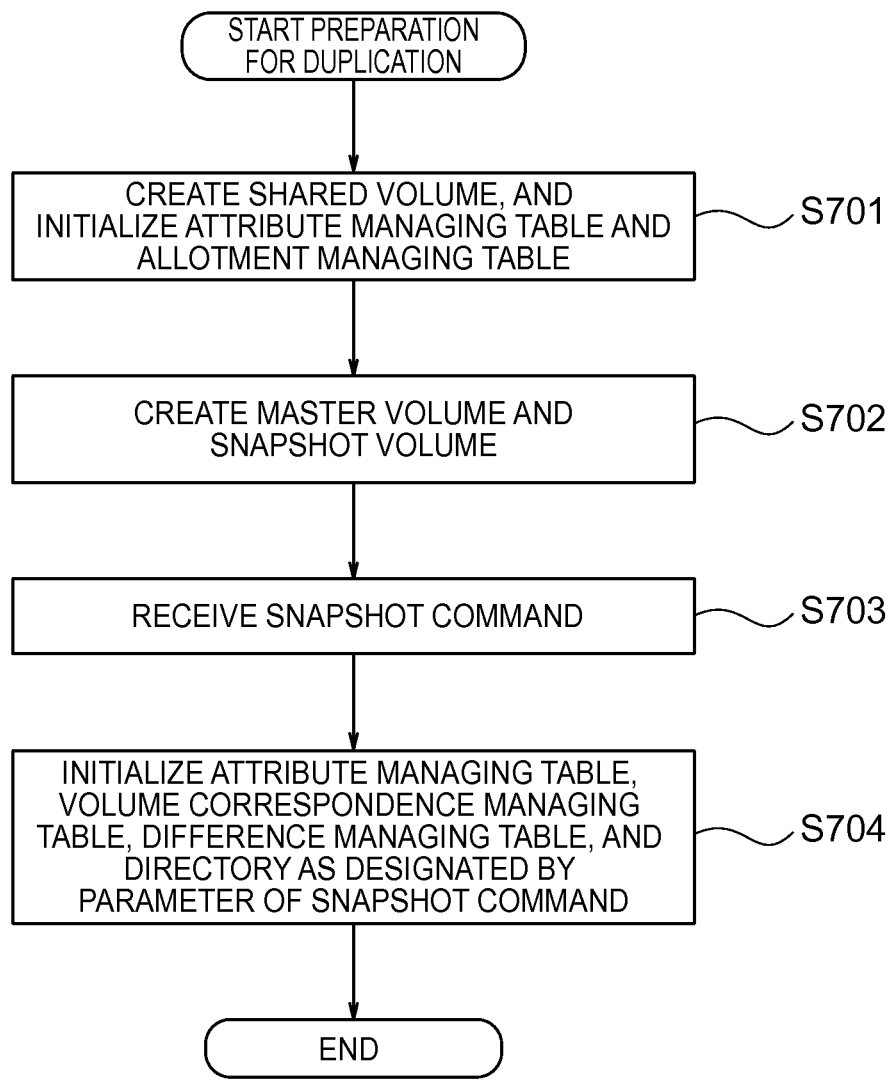
FIG. 12 is a flowchart showing a duplication preparatory operation of the system according to the related art technique disclosed in FIG. 9.
Figure 13:
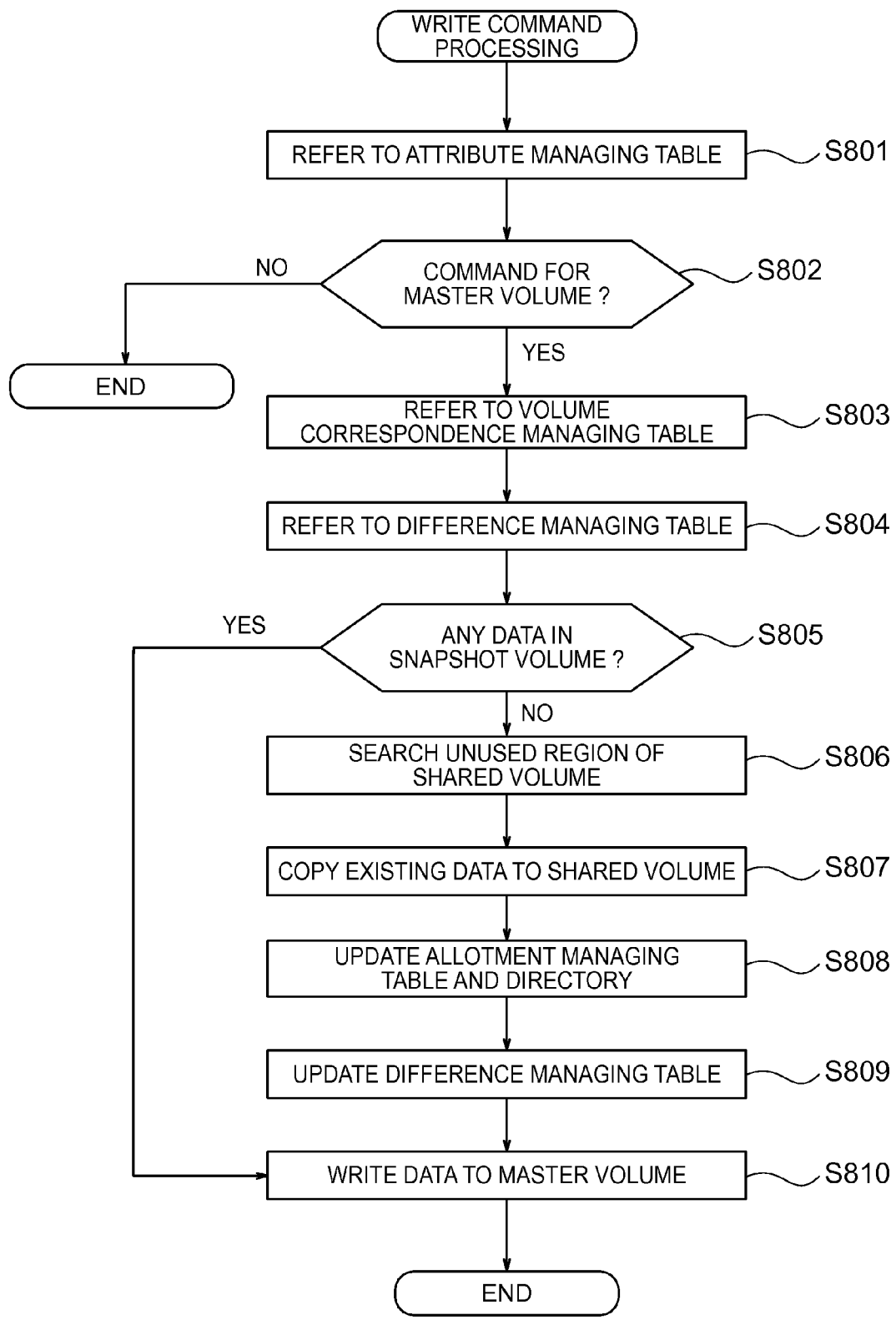
FIG. 13 is a flowchart showing an operation procedure for a write command executed in the system according to the related art technique disclosed in FIG. 9.
Figure 14:
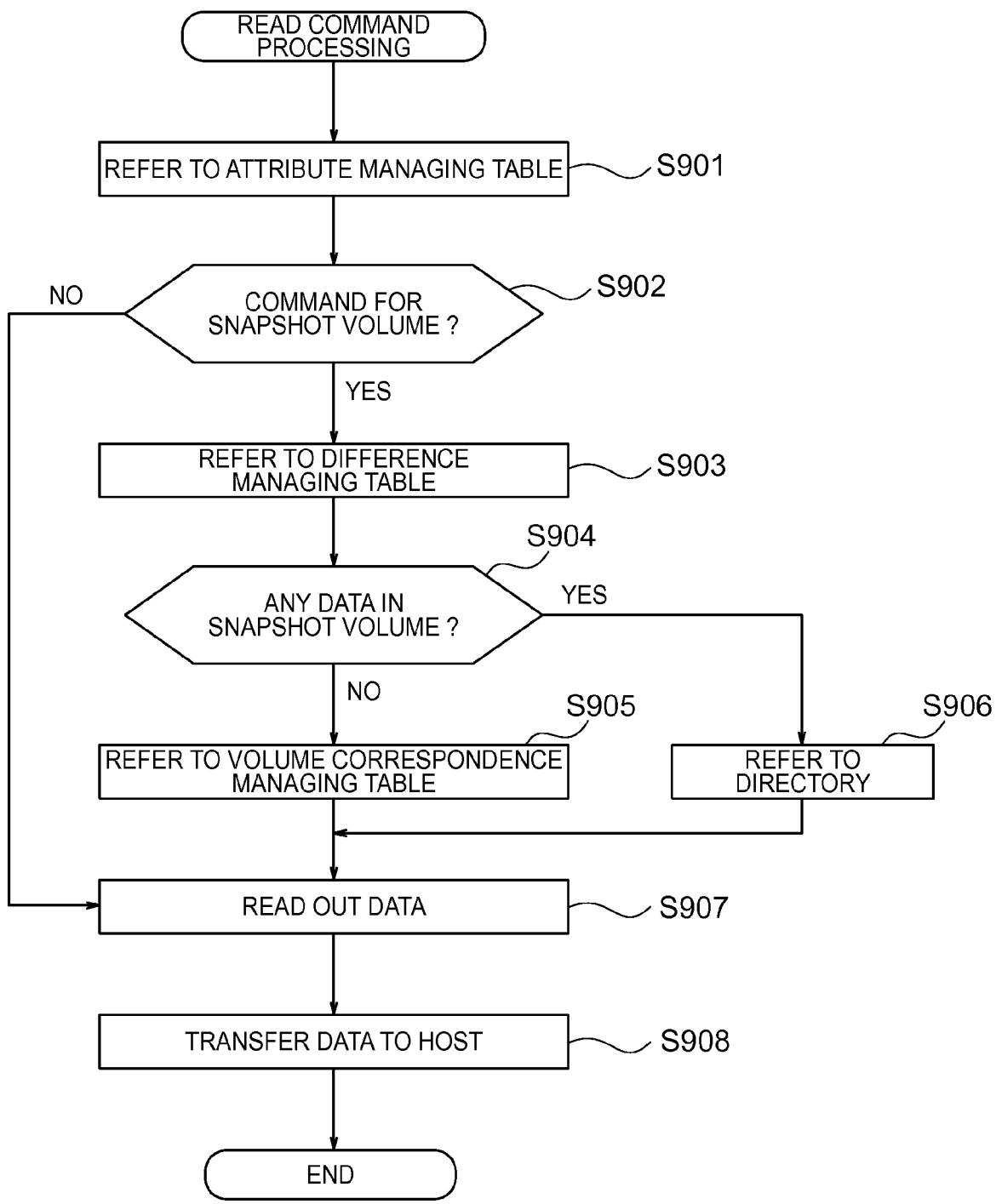
FIG. 14 is a flowchart showing an operation procedure for a read command executed in the system according to the related art technique disclosed in FIG. 9.
Figure 15:
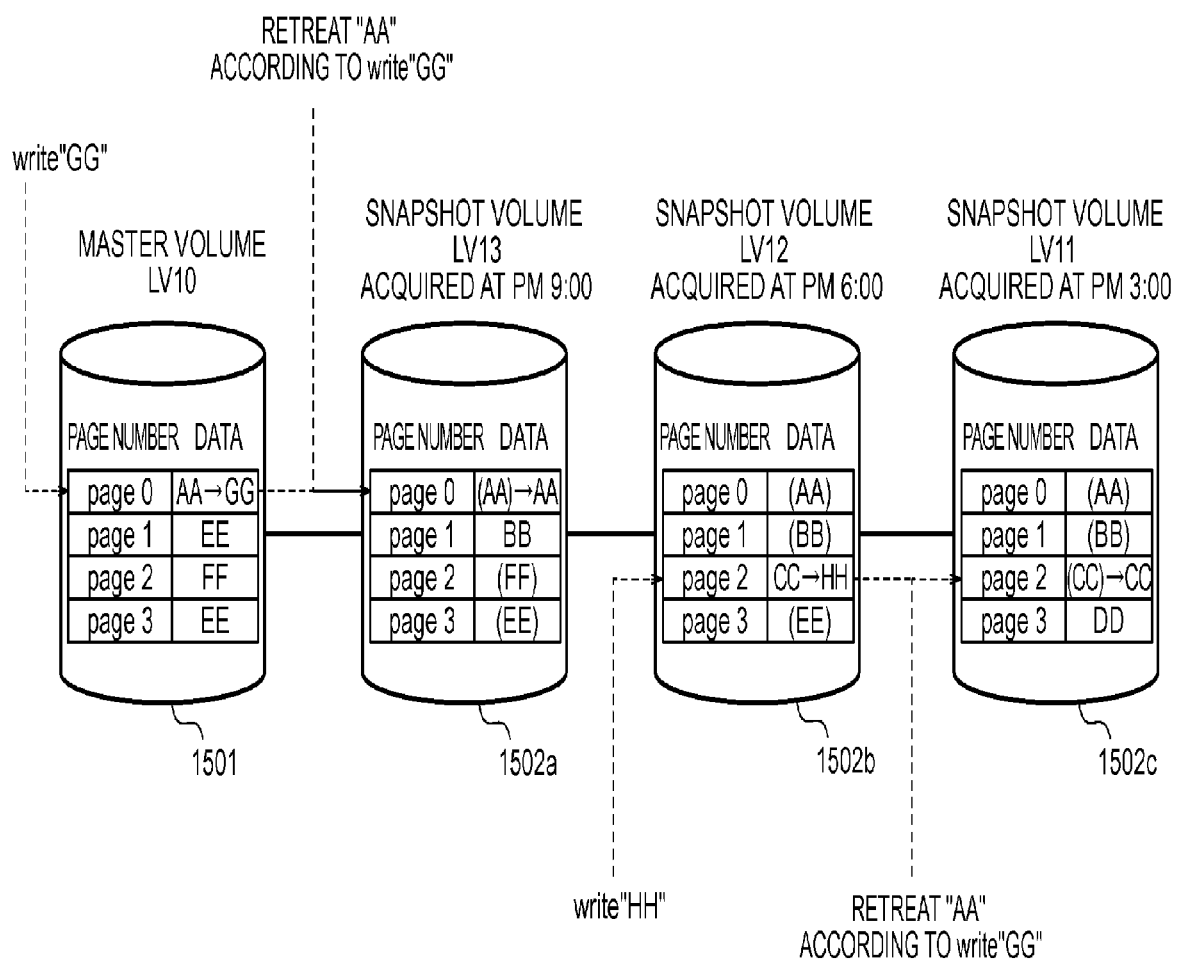
FIG. 15 is an explanatory chart showing an example of a state where a master volume and a plurality of snapshot volumes are connected/managed in the system according to the related art technique.

When receiving a read command, first, the main control unit 11 refers to the attribute managing table 21 (FIG. 8: step S401), and judges whether or not the read-command target volume has the snapshot attribute (FIG. 8: step S402).

When judged in step S402 of FIG. 8 that it does not have the snapshot attribute (FIG. 8: step S402/No), the read-command target volume is a volume that is irrelevant to the snapshot processing. Thus, the data is read out from the read-command target volume (FIG. 8: step 403), the read out data is transferred to the host (FIG. 8: step S404), and the read command is ended. In the meantime, when judged in step S402 of FIG. 8 that it has the snapshot attribute (FIG. 8: step S402/Yes), the update managing table 25 is then referred in order to judge whether or not the read-command target volume already holds the data (FIG. 8: step S405).

Then, judgment of the update managing table 25 is executed (FIG. 8: step S406). When judged as a result that there is data (data is held) in the corresponding section of the read-command target volume (FIG. 8: step S406/Yes), the update managing directory 33 is referred, and the readout target is switched from the duplication volume 10B to the shared volume 10D that is stored in the update managing directory 33 (FIG. 8: step S407).

Then, the data is read out from the shared volume 10D (FIG. 8: step S408), the read out data is transferred to the host (FIG. 8: step S404), and the read command is ended.

Further, when judged in step S406 of FIG. 8 that there is no directly updated data in the duplication volume 10B, the difference managing table 24 is then referred in step S409 (FIG. 8: step S409), and it is judged in step S410 whether or not there is difference data in the difference managing table 24 (FIG. 8: step S410).

When judged in step S410 of FIG. 8 that there is a difference in the duplication volume 10B (FIG. 8: step S410/Yes), the difference managing directory 31 is referred, and the readout-target is switched from the duplication volume to the shared volume 10D that is stored in the difference managing directory 31 (FIG. 8: step S411).

Then, the data is read out from the shared volume (FIG. 8: step S412), the read out data is transferred to the host (FIG. 8: step S404), and the read command is ended.

When judged in step S410 of FIG. 8 that there is no directly updated data in the duplication volume 10B, it means that the duplication volume 10B to which the read command is issued does not hold data. In this case, it is necessary to search the place where the actual data of the data referred by the duplication volume 10B as the read-command target is held from the duplication volume 10B or the master volume 10A of the higher-order generation.

In this case, the volume correspondence managing table 22 and the generation managing table 23 are referred (FIG. 8: step S413), and the generation number of the duplication volume 10B as the read-command target and the other duplication volume 10C that is the pair of the same master volume 10A are searched.

Next, when judged in step S414 of FIG. 8 that the currently searched generation number of the duplication volume is "1", it means that the actual data referred by the duplication volume 10B exists in the master volume 10A. Thus, the readout target of the read command is set as the master volume 10A (FIG. 8: step S416), the data is read out from the master volume (FIG. 8: step S417), the read-out data is transferred to the host (FIG. 8: step S404), and the read command is ended.

Further, when judged in step S414 of FIG. 8 described above that the generation number is not "1", i.e., the generation number is "2" or larger, the duplication volume 10B of one generation higher is selected as the next search-target snapshot from the duplication volumes 10B having the same master volume 10A in step S415.

For example, in a case where the current master volume is LV0, the current search-target duplication volume is LV1, and the generation number of LV1 is "2", the duplication volume 10B having the same LV0 as the master volume 10A is searched from the volume correspondence table 22. Further, processing for specifying the duplication volume LV3 having the generation number "1" that is the generation number smaller by 1 from the generation managing table 23 is executed to determine the duplication volume (snapshot volume) 10B of the higher-order generation.

After the duplication volume 10B to be searched anew is determined, steps S409 to S415 are repeated again. The volume search processing is continued until the readout target volume is determined.

After the readout-target volume is determined, the data is read out from the corresponding master volume 10A or the shared volume 10D, the read-out data is transferred to the host, and the read command is ended.

As described, the proper data can be read out by performing the read command processing in the manner described above. For example, in FIG. 2, when a read command is issued to page 1 of the duplication volume LV1, the data of B0 is read out from the duplication volume LV3 of the higher-order generation and the data is returned to the host.

Further, when a read command is issued to page 3 of the duplication volume LV1, data of D0 can be read out not from the duplication volume LV3 of the higher-order generation but from the master volume LV0.

Further, the read command for page 3 of the duplication volume LV3 can read out the data D2 that is directly updated.

The generation management of the duplication volume 10B (10C) is executed through managing the duplication volumes 10B (10C) by the method described heretofore. While holding those for the backup purpose, a specific volume therein can be used for a secondary use such as for a development work. Further, even when data update occurs in the duplication volumes 10B (10C) during the secondary use, influences upon the work that uses the master volume 10A can be avoided since there is no access made to the master volume 10A.

Note here that the operation contents of the working components of each of the above-described structures may be put into a program to be executable by a computer and have it executed by the computer provided to the main control unit 11 which executes each of the above-described steps. In this case, each program may be recorded in a non-transitory recording medium such as a DVD, a CD, or a flash memory. In that case, the program is read out from the recording medium by the computer and executed.

In the exemplary embodiment disclosed in FIG. 1 to FIG. 8 described above, the method which holds the substance of the data image of the snapshot in the shared pool volume 10D is described. However, as method for holding the data image, it is also possible to employ a mode which directly holds it in the duplication volume.

Further, while the explanations are provided on the assumption that the various managing table information is on the control memory 15, the managing information may be stored in the magnetic disk device such as a vacant region on the shared pool volume 10D in a case where the master volume 10A, the duplication volumes 10B (10C), or the shared pool volume 10D are used.

Furthermore, the disk device is not limited only to the magnetic disk device. For example, a storage device using a flash memory or a virtual disk device created on a memory may be used instead of the magnetic disk device.

The present invention is structured in the manner described above. As an exemplary advantage according to the invention, the main control unit and the control memory provided therewith function effectively as described above at the time of executing the write command processing inputted from outside to execute the data update processing of the snapshot volume as a duplication volume smoothly without imposing a load on the master volume. Therefore, it is possible to provide the excellent data duplication system, data duplication method, and program thereof capable of improving the usability of the duplication volume, which cannot be done with the related techniques described above.

While the present invention has been described above by referring to the specific exemplary embodiments shown in the accompanying drawings, the present invention is not limited only to each of the exemplary embodiments. Any changes and modifications occurred to those skilled in the art can be applied to the structures and the details of the present invention. Further, it is to be noted that the present invention includes combinations of a part of or the entire part of the structures of each of the exemplary embodiments combined mutually in an appropriate manner. While a part of or the entire part of the exemplary embodiments can be summarized as in following Supplementary Notes, the present invention is not necessarily limited to those structures.

(Supplementary Note 1)

A snapshot-type data duplication system which includes: duplication volumes 10B (10C) having a same capacity as that of a master volume 10A; a shared pool volume 10D which stores duplication data of the duplication volumes 10B (10C); and a main control unit which manages data accesses for the duplication data made from outside (a host computer) to the duplication volumes 10B (10C) and manages a storing place of the duplication data, wherein:

the main control unit includes a data duplication control module 12 which manages data accesses made from outside to the duplication volumes 10B (10C), and an address changing module 13 which manages the storing place of the duplication data; and the data duplication control module 12 includes a data duplication update processing function which duplicates data of the master volume 10A to the duplication volumes 10B (10C) when updating the master volume 10A, and directly updates the data of the duplication volumes 10B (10C) when updating the data of the duplication volume 10B (10C).

(Supplementary Note 2)

The data duplication system as depicted in Supplementary Note 1, wherein:

the data duplication control module 12 is provided with a data duplication control memory 15A which includes a difference managing table 24 for managing that data duplication is executed from the master volume 10A to the duplication volumes 10B (10C) and an update managing table 25 for managing that update of the data duplication is directly executed to the duplication volumes 10B (10C);

the data duplication control module 12 executes the data duplication update processing function based on information stored in the data duplication control memory 15A; and the address changing module 13 is provided with an address changing control memory 15B which includes an allotment managing table for managing the use state of the shared pool volume 10D.

(Supplementary Note 3)
The data duplication system as depicted in Supplementary Note 2, wherein
the data duplication control memory 15A includes a volume correspondence managing table for managing pair relationships between the master volume 10A and the duplication volumes 10B (10C), and a generation managing table 23 for executing a chronological generation management of the duplication volumes 10B (10C).

(Supplementary Note 4)
The data duplication system as depicted in Supplementary Note 1, 2, or 3, wherein
when executing the data duplication update function, data duplication is not executed for another duplication volume 10C at the time of executing data update for one of the plurality of duplication volumes 10B (10C).

(Supplementary Note 5)
The data duplication system as depicted in Supplementary Note 1, 2, or 3, wherein
the data duplication control module 12 includes a read data readout restricting function which, for a readout request made from outside (a host computer) for the duplication volume 10B (10C), sets a second data read out from another duplication volume 10C via a given duplication volume 10B as data of different content from that of a first data that is read out from the given duplication volume 10B among the plurality of duplication volumes 10B (10C).

(Supplementary Note 6)
The data duplication system as depicted in Supplementary Note 2 or 3, wherein:
a difference managing directory 31 for holding storing addresses of actual data of each of the duplication volumes 10B (10C) and an update managing directory 33 for holding actual data addresses when direct update for each of the duplication volumes 10B (10C) occurs are stored in the address changing control memory 15B; and
the address changing module 13 includes a duplication data storing place managing function which manages storing places of the duplication data based on information stored in the address changing control memory 15B.

(Supplementary Note 7) (Invention of Method/Write Command Processing: Related to Update)
A data duplication method used in a snapshot-type data duplication system which includes duplication volumes 10B (10C) for a master volume, a shared pool volume 10D which stores duplication data of the duplication volumes 10B (10C), and a main control unit which manages data accesses for the duplication data made from outside (a host computer) to the duplication volumes 10B (10C) and manages a storing place of the duplication data. The method includes:
an update processing judging step for judging whether or not update processing for the duplication volume 10B is already executed by referring to an update managing table set in advance, when a write command for the duplication volume 10B is inputted;
a shared volume writing step (a first step) for specifying an address of the shared pool volume allotted in advance to the duplication volume 10B as a target of the write command and writing data that corresponds to the write command thereto, when judged in the update processing judging step that there is a difference in the duplication volume 10B; and
an update data reference target registering step for storing, to a prescribed memory, the address allotted on the shared volume that is a reference target of the update data of the duplication volume 10B in the shared volume writing step (the first step), and for registering data showing that there is update data in the duplication volume 10B to a corresponding section of the update managing table, wherein
each processing content of judgment, writing, and registration done in each of the steps is executed by the main control unit.

(Supplementary Note 8) (Invention of Method/Write Command Processing: Related to Update)
A data duplication method used in a snapshot-type data duplication system which includes duplication volumes 10B (10C) for a master volume, a shared pool volume 10D which stores duplication data of the duplication volumes 10B (10C), and a main control unit which manages data accesses for the duplication data made from outside (a host computer) to the duplication volumes 10B (10C) and manages a storing place of the duplication data. The method includes:
an update processing judging step for judging whether or not update processing for the duplication volume 10B is already executed by referring to an update managing table set in advance, when a write command for the duplication volume 10B is inputted;
a vacant region searching step for searching a vacant region of the shared volume by referring to an allotment managing table set in advance, when judged in the update processing judging step that there is no difference (no update) in the duplication volume 10B;
a shared volume writing step (a second step) for writing data that corresponds to the write command to the vacant region, when the vacant region of the shared pool volume is found in the vacant region searching step; and
an update data reference target registering step for storing, to a prescribed memory, an address of the vacant region allotted on the shared volume as a reference target of the update data of the duplication volume 10B in the shared volume writing step (the second step), and for registering data showing that there is update data in the duplication volume 10B to a corresponding section of the update managing table, wherein
each processing content of judgment, searching, writing, and registration done in each of the steps is executed by the main control unit.

(Supplementary Note 9) (Invention of Program/Correspond to Write Command: Related to Update)
A data duplication processing program used in a snapshot-type data duplication system which includes duplication volumes 10B (10C) for a master volume, a shared pool volume 10D which stores duplication data of the duplication volumes 10B (10C), and a main control unit which manages data accesses for the duplication data made from outside (a host computer) to the duplication volumes 10B (10C) and manages a storing place of the duplication data. The program includes:
an update processing judging function for judging whether or not update processing for the duplication volume 10B is already executed by referring to an update managing table set in advance, when a write command for the duplication volume 10B is inputted;
a shared pool volume writing processing function (a first processing function) for specifying an address of the shared volume allotted in advance to the duplication volume 10B as a target of the write command and writing data that corresponds to the write command thereto, when judged by the update processing judging function that there is a difference in the duplication volume 10B; and an update data reference target registering processing function for storing, to a prescribed memory, the address allotted on the shared volume that is a reference target of the update data of the duplication volume 10B by the shared volume writing processing function (the first processing function) and for registering data showing that there is update data in the duplication volume 10B to a corresponding section of the update managing table, wherein each processing content of judgment, writing, and registration done in each of the processing functions is executed by a computer that is provided to the main control unit.

(Supplementary Note 10) (Invention of Program/Correspond to Write Command: Related to Update)

A data duplication processing program used in a snapshot-type data duplication system which includes duplication volumes 10B (10C) for a master volume, a shared pool volume 10D which stores duplication data of the duplication volumes 10B (10C), and a main control unit which manages data accesses for the duplication data made from outside to the duplication volumes 10B (10C) and manages a storing place of the duplication data. The program includes:

an update processing judging function for judging whether or not update processing for the duplication volume 10B is already executed by referring to an update managing table set in advance, when a write command for the duplication volume 10B is inputted:

a vacant region search processing function for searching a vacant region of the shared volume by referring to an allotment managing table set in advance, when judged by the update processing judging function that there is no difference (no update) in the duplication volume 10B;

a shared volume writing processing function (a second processing function) for writing data that corresponds to the write command to the vacant region, when the vacant region of the shared volume is found by the vacant region search processing function; and an update data reference target registering processing function for storing, to a prescribed memory, an address allotted on the shared volume as a reference target of the update data of the duplication volume 10B by the shared volume processing function (the second processing function), and for registering data showing that there is update data in the duplication volume 10B to a corresponding section of the update managing table, wherein each processing content of judgment, searching, writing, and registration done in each of the processing functions is executed by a computer that is provided to the main control unit.

(Supplementary Note 11) (Invention of Method/Correspond to Read Command: No Update)

A data duplication method used in a snapshot-type data duplication system which includes duplication volumes 10B (10C) for a master volume, a shared pool volume 10D which stores duplication data of the duplication volumes 10B (10C), and a main control unit which manages data accesses for the duplication data made from outside (a host computer) to the duplication volumes 10B (10C) and manages a storing place of the duplication data. The method includes:

a data hold judging step for judging whether or not a given duplication volume 10B that is the target of a read command holds the read-command target data by referring to an update managing table set in advance, when the read command for the duplication volume 10B is inputted from the host;

a shared volume reading out step for specifying an address of the shared volume allotted in advance to the duplication volume 10B as the target of the read command and reading out the data that corresponds to the read command therefrom, when judged in the data hold judging step that there is the data to be the target of the read command; and a read data transfer step for transferring the read out data to the host, wherein each processing content of judgment, readout, and transfer done in each of the steps is executed by the main control unit.

(Supplementary Note 12) (Invention of Method/Correspond to Read Command: No Update)

A data duplication method used in a snapshot-type data duplication system which includes duplication volumes 10B (10C) for a master volume, a shared pool volume 10D which stores duplication data of the duplication volumes 10B (10C), and a main control unit which manages data accesses for the duplication data made from outside (a host computer) to the duplication volumes 10B (10C) and manages a storing place of the duplication data. The method includes:

a data hold judging step for judging whether or not a given duplication volume 10B that is the target of a read command holds the read-command target data by referring to an update managing table set in advance, when the read command for the duplication volume 10B is inputted from the host;

a difference data existence judging step for judging whether or not there is difference data that corresponds to the duplication volume 10B by referring to a difference managing table set in advance, when judged in the data hold judging step that there is no directly updated data in the duplication volume 10B; and a read data readout/transfer step for switching the readout target volume to the shared volume that is associated with the duplication volume 10B in advance, reading out the data corresponding to the read command from the shared volume, and transferring the read out data to the host, when judged in the difference data existence judging step that there is the difference data, wherein each processing content of judgment, judgment, and readout/transfer done in each of the steps is executed by the main control unit.

(Supplementary Note 13) (Invention of Program/Correspond to Read Command: No Update)

A data duplication processing program used in a snapshot-type data duplication system which includes duplication volumes 10B (10C) for a master volume, a shared pool volume 10D which stores duplication data of the duplication volumes 10B (10C), and a main control unit which manages data accesses for the duplication data made from outside (a host computer) to the duplication volumes 10B (10C) and manages a storing place of the duplication data. The program includes:

a data hold judgment processing function for judging whether or not a given duplication volume 10B that is the target of a read command holds the read-command target data by referring to an update managing table set in advance, when the read command for the duplication volume 10B is inputted from the host;

a read target specifying processing function for specifying an address of the shared volume allotted in advance to the duplication volume 10B as the target of the read command, when judged in the data hold judgment processing function that there is the data to be the target of the read command; and a read data readout/transfer processing function for reading out the data that corresponds to the read command from the specified shared volume and transferring the read out data to the host, wherein each processing content of judgment, specifying, and readout/transfer done in each of the processing functions is executed by a computer that is provided to the main control unit.

(Supplementary Note 14) (Invention of Program/Correspond to Read Command: No Update)

A data duplication processing program used in a snapshot-type data duplication system which includes duplication volumes 10B (10C) for a master volume, a shared pool volume 10D which stores duplication data of the duplication volumes 10B (10C), and a main control unit which manages data accesses for the duplication data made from outside (a host computer) to the duplication volumes 10B (10C) and manages a storing place of the duplication data. The program includes:

a data hold judgment processing function for judging whether or not a given duplication volume 10B that is the target of a read command holds the read-command target data by referring to an update managing table set in advance, when the read command for the duplication volume 10B is inputted from the host;

a difference data existence judgment processing function for judging whether or not there is difference data that corresponds to the duplication volume 10B by referring to a difference managing table set in advance, when judged in the data hold judgment processing function that there is no directly updated data in the duplication volume 10B; and a read data readout/transfer processing function for switching the readout target volume to the shared volume that is associated with the duplication volume 10B in advance, reading out the data corresponding to the read command from the shared volume, and transferring the read out data to the host, when judged in the difference data existence judgment processing function that there is the difference data, wherein each processing content of judgment, judgment, and readout/transfer done in each of the processing functions is executed by a computer that is provided to the main control unit.

INDUSTRIAL APPLICABILITY

The present invention can be utilized for backup and the like of a volume level in a magnetic disk array subsystem.

What is claimed is:

1. A snapshot-type data duplication system, comprising: duplication volumes for a master volume; a shared pool volume which stores duplication data of the duplication volumes; and a main control unit which manages data accesses for the duplication data made from outside to the duplication volumes and manages a storing place of the duplication data, wherein:

the main control unit comprises a data duplication control module which manages data accesses made from outside to the duplication volume, and an address changing module which manages the storing place of the duplication data;

the data duplication control module includes a data duplication update processing function which duplicates data of the master volume to the duplication volume when updating the master volume, and performs an update to the data of the duplication volume without using an intermediary when updating the data of the duplication volume;

the data duplication control module is provided with a data duplication control memory which comprises a difference managing table for storing that data duplication is executed from the master volume to the duplication volume and an update managing table for storing that update to the data duplication is performed to the duplication volume without using an intermediary;

the address changing module is provided with an address changing control memory which comprises an allotment managing table for storing use state of the shared pool volume;

the data duplication control module judges whether or not the update to the duplication volume without using the intermediary is already executed by referring to the update managing table stored in the data duplication control memory when updating the data of the duplication volume, writes data that corresponds to the write command to the address of the shared pool volume allotted in advance to the duplication volume when judged that there is an update in the duplication volume, searches a vacant region of the shared volume by referring to the allotment managing table when judged that there is no update in the duplication volume, writes data that corresponds to the write command, when the vacant region of the shared pool volume is found in a step of searching the vacant region, to the found vacant region, stores an address of the vacant region on the shared pool volume to which the data has been written to a prescribed memory as a reference target of the update data of the duplication volume, and registers data showing that there is update data in the duplication volume to a corresponding section of the update managing table, to execute the data duplication update processing function.

2. The data duplication system as claimed in claim 1, wherein the data duplication control memory comprises a volume correspondence managing table for storing a correspondence relationship between the master volume and one or more duplication volumes corresponding to the master volume, and a generation managing table for storing a chronological generation at which the duplication volumes are created.

3. The data duplication system as claimed in claim 1, wherein when executing the data duplication update processing function, data duplication is not executed for other duplication volumes at the time of executing data update for one of the plurality of duplication volumes.

4. The data duplication system as claimed in claim 1, wherein the data duplication control module includes a read data readout restricting function which, for a readout request made from outside for the duplication volume, sets a second data read out from another duplication volume via a given duplication volume as data of different content from that of a first data that is read out from the given duplication volume among the plurality of duplication volumes.

5. The data duplication system as claimed in claim 1, wherein:

a difference managing directory for holding storing addresses of actual data of each of the duplication volumes and an update managing directory for holding actual data addresses when direct update for each of the duplication volumes occurs are stored in the address changing control memory; and the address changing module includes a duplication data storing place managing function which manages storing places of the duplication data based on information stored in the address changing control memory.

6. A data duplication method used in a snapshot-type data duplication system which comprises duplication volumes for a master volume, a shared pool volume which stores duplication data of the duplication volumes, and a main control unit which manages data accesses for the duplication data made from outside to the duplication volumes and manages a storing place of the duplication data, the method comprising:

judging whether or not update processing to the duplication volume without using an intermediary is already executed by referring to an update managing table set in advance, when a write command for the duplication volume is inputted;

writing data that corresponds to the write command to an address of the shared pool volume allotted in advance to the duplication volume, when judged in a judging step of the update processing that there is a difference in the duplication volume;

searching a vacant region of the shared volume by referring to an allotment managing table set in advance, when judged in the judging step of the update processing that there is no difference in the duplication volume;

writing data that corresponds to the write command, when the vacant region of the shared pool volume is found in a step of searching the vacant region, to the found vacant region; and storing, to a prescribed memory, an address of the vacant region on the shared pool volume to which the data has been written as a reference target of the update data of the duplication volume, and registering data showing that there is update data in the duplication volume to a corresponding section of the update managing table, wherein each processing content of judgment, writing, and registration done in each of the steps is executed by the main control unit.

7. A non-transitory computer readable recording medium storing a data duplication processing program used in a snapshot-type data duplication system which comprises duplication volumes for a master volume, a shared pool volume which stores duplication data of the duplication volumes, and a main control unit which manages data accesses for the duplication data made from outside to the duplication volumes and manages a storing place of the duplication data, the program comprising:

an update processing judging function for judging whether or not update processing to the duplication volume without using an intermediary is already executed by referring to an update managing table set in advance, when a write command for the duplication volume is inputted;

a vacant region searching processing function for searching a vacant region of the shared volume by referring to an allotment managing table set in advance, when judged by the update processing judging function that there is no difference in the duplication volume;

a shared pool volume writing processing function for specifying an address of the shared pool volume allotted in advance to the duplication volume as a target of the write command and writing data that corresponds to the write command to the address of the shared pool volume, when judged by the update processing judging function that there is a difference in the duplication volume, and writing data that corresponds to the write command to the vacant region found by the update processing judging function, when judged by the update processing judging function that there is no difference in the duplication volume; and an update data reference target registering processing function for storing, to a prescribed memory, the address allotted on the shared pool volume that is a reference target of the update data of the duplication volume by the shared pool volume writing processing function and for registering data showing that there is update data in the duplication volume to a corresponding section of the update managing table, wherein each processing content of judgment, writing, and registration done in each of the processing functions is executed by a computer that is provided to the main control unit.

* * * * *